US012638318B2

(12) United States Patent
Huang

(10) Patent No.: US 12,638,318 B2
(45) Date of Patent: May 26, 2026

(54) MULTIPHASE FLOW METERS AND RELATED METHODS

(71) Applicant: Schlumberger Technology Corporation, Sugar Land, TX (US)

(72) Inventor: Songming Huang, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 541 days.

(21) Appl. No.: 18/245,205

(22) PCT Filed: Sep. 14, 2020

(86) PCT No.: PCT/US2020/050658
§ 371 (c)(1),
(2) Date: Mar. 14, 2023

(87) PCT Pub. No.: WO2022/055504
PCT Pub. Date: Mar. 17, 2022

(65) Prior Publication Data
US 2023/0408309 A1     Dec. 21, 2023

(51) Int. Cl.
*G01F 1/56*         (2006.01)
*G01F 1/74*         (2006.01)
(Continued)

(52) U.S. Cl.
CPC .................. *G01F 1/56* (2013.01); *G01F 1/74* (2013.01); *G01F 15/02* (2013.01); *G01F 15/063* (2013.01)

(58) Field of Classification Search
CPC ..... G01F 1/56; G01F 1/74; G01F 1/00; G01F 15/02; G01F 15/00; G01F 15/063
See application file for complete search history.

(56) References Cited

U.S. PATENT DOCUMENTS

| | | | |
|---|---|---|---|
| 7,276,916 B2 | 10/2007 | Hammer | |
| 2006/0152227 A1* | 7/2006 | Hammer | G01N 27/06 324/634 |

(Continued)

FOREIGN PATENT DOCUMENTS

| | | |
|---|---|---|
| CN | 101255791 B | 5/2011 |
| CN | 102077061 A | 5/2011 |

(Continued)

OTHER PUBLICATIONS

International Preliminary Report on Patentability of International Patent Application No. PCT/US2020/050658 dated Mar. 23, 2023, 8 pages.

(Continued)

*Primary Examiner* — Mohamed Charioui

(74) *Attorney, Agent, or Firm* — Kyle R. Miiller

(57) ABSTRACT

Example multiphase fluid meters and related methods are disclosed herein. An example apparatus includes a fluid conduit coupled to tubing. A multiphase fluid is to flow from the tubing into the fluid conduit. The example apparatus includes a flow channel defined in the fluid conduit. The fluid is to flow through the flow channel. The flow channel has a cross-sectional shape different from a cross-sectional shape of the tubing. The example apparatus includes one or more sensors coupled to the flow channel to generate data indicative of a property of the multiphase fluid.

13 Claims, 19 Drawing Sheets

(51) Int. Cl.
  G01F 15/02          (2006.01)
  G01F 15/063         (2022.01)

(56)                References Cited

U.S. PATENT DOCUMENTS

| | | | | |
|---|---|---|---|---|
| 2008/0319685 A1* | 12/2008 | Xie | ........................... | G01N 9/24 |
| | | | | 356/70 |
| 2013/0319132 A1* | 12/2013 | Lupeau | ..................... | G01F 1/36 |
| | | | | 378/54 |
| 2015/0276445 A1 | 10/2015 | Black | | |
| 2016/0290841 A1 | 10/2016 | Cadalen et al. | | |
| 2016/0298990 A1 | 10/2016 | Black et al. | | |
| 2018/0010429 A1* | 1/2018 | Willberg | ................. | E21B 43/12 |
| 2018/0348035 A1* | 12/2018 | Huang | .................... | G01F 23/26 |
| 2019/0032477 A1* | 1/2019 | Huang | ............... | G01N 33/2823 |

FOREIGN PATENT DOCUMENTS

| | | |
|---|---|---|
| CN | 102575949 A | 7/2012 |
| CN | 103038609 A | 4/2013 |
| CN | 110945327 A | 3/2020 |
| EP | 510774 A2 | 10/1992 |
| WO | 2000045133 A1 | 8/2000 |

OTHER PUBLICATIONS

Search Report and Written Opinion of International Patent Application No. PCT/US2020/050658 dated May 20, 2021, 10 pages.

\* cited by examiner

FLUID ANALYZER 138

140

142    144

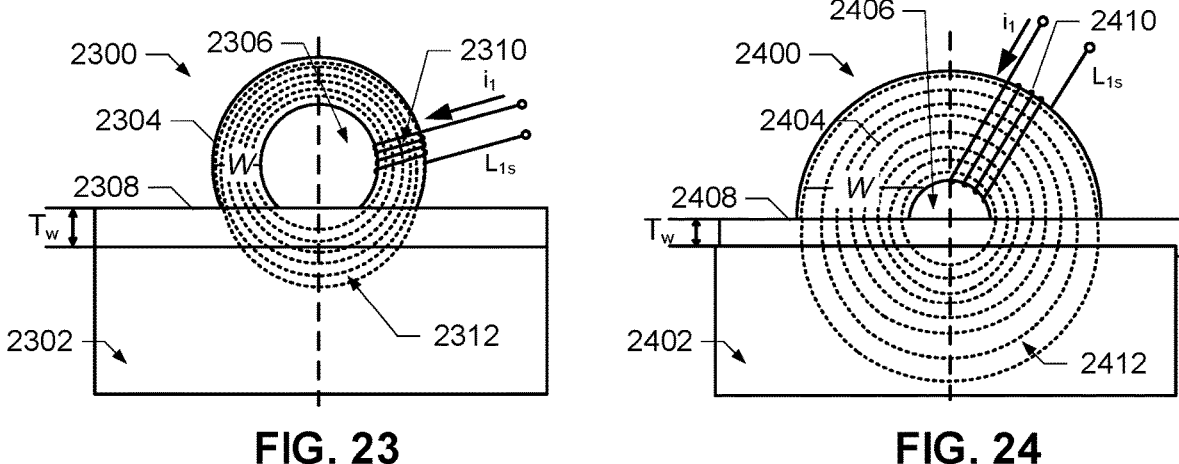
FIG. 23
FIG. 24
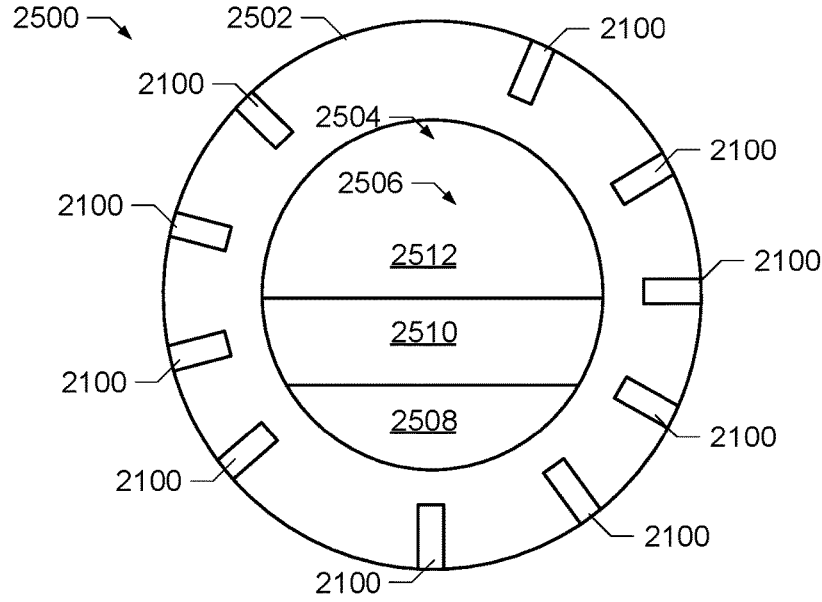
FIG. 25

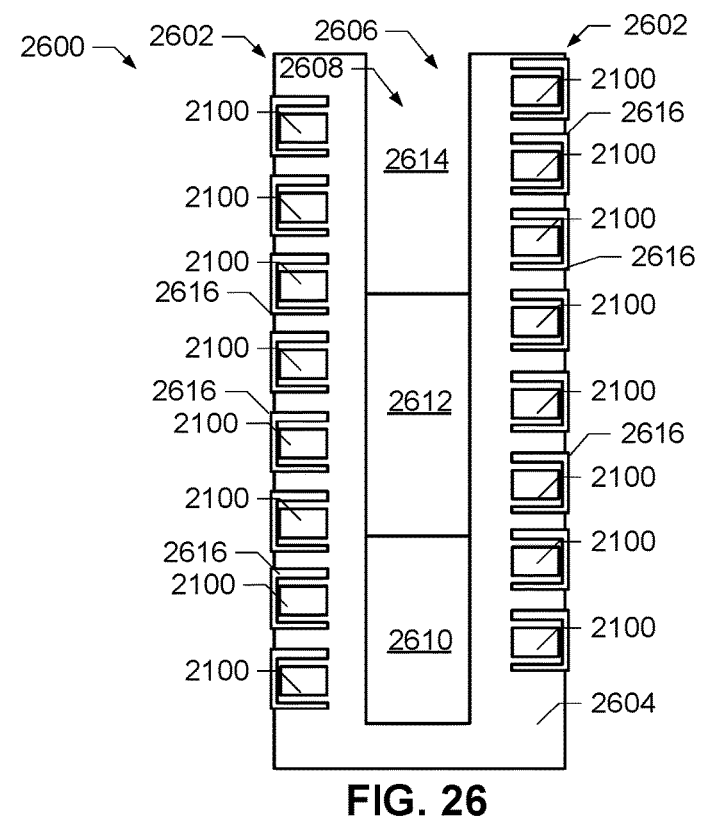
FIG. 26
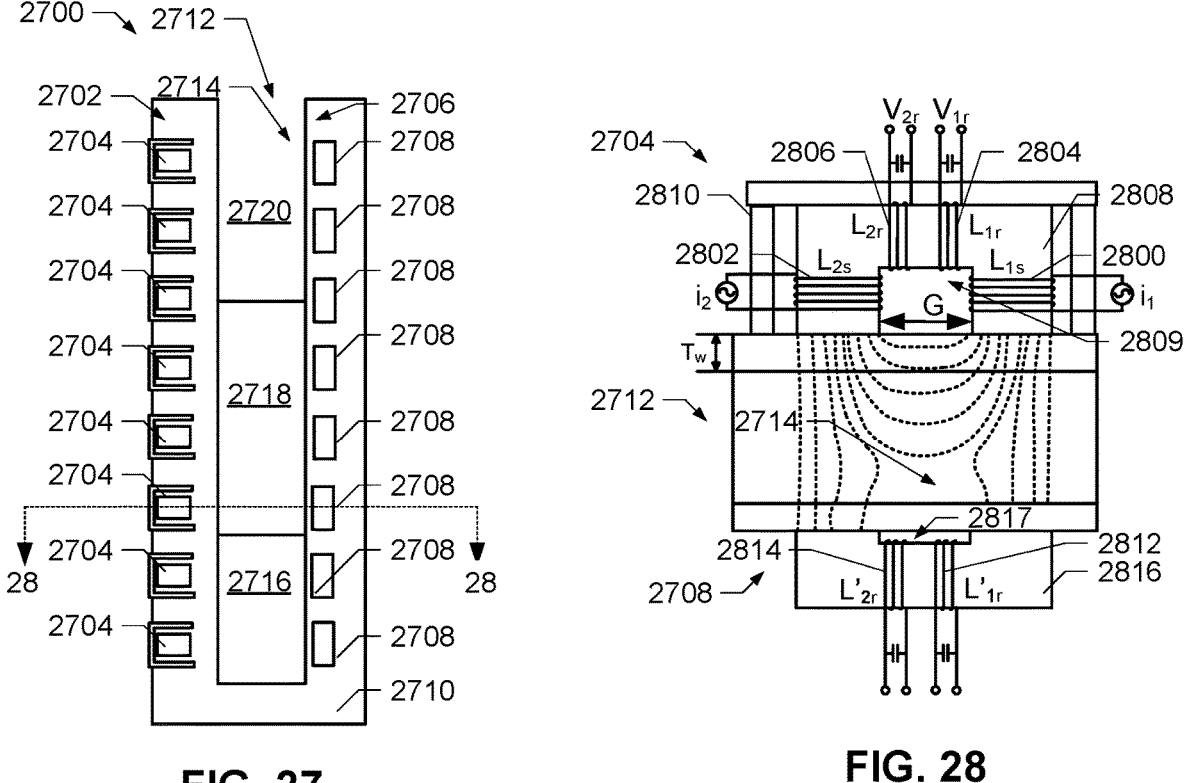
FIG. 27
FIG. 28

2900

START

COUPLE SENSOR(S) TO SENSOR SUPPORT(S) — 2902

DEFINE FLUID FLOW PATH VIA SENSOR SUPPORT(S) — 2904

COUPLE SENSOR SUPPORT(S) TO FLUID CONDUIT — 2906

END

3000

START

COUPLE FLOW METER TO PRODUCTION TUBING TO ENABLE PRODUCTION FLUID TO FLOW THROUGH METER — 3002

COMMUNICATIVELY COUPLE FLOW METER TO TELEMETRY SYSTEM — 3004

END

3100

START

ACCESS SENSOR DATA FROM SENSOR(S) DURING FLOW OF FLUID THROUGH FLUID CONDUIT OF FLOW METER — 3102

ANALYZE SENSOR DATA WITH RESPECT TO ELECTRICAL IMPEDANCE CHANGES, DIFFERENTIAL PRESSURE, AND/OR ULTRASONIC SIGNALS — 3104

DETERMINE FLUID PROPERTIES BASED ON SENSOR DATA ANALYSIS — 3106

Yes     CONTINUE ANALYZING FLUID FLOWING THROUGH FLOW METER? — 3108

No

END — 3110

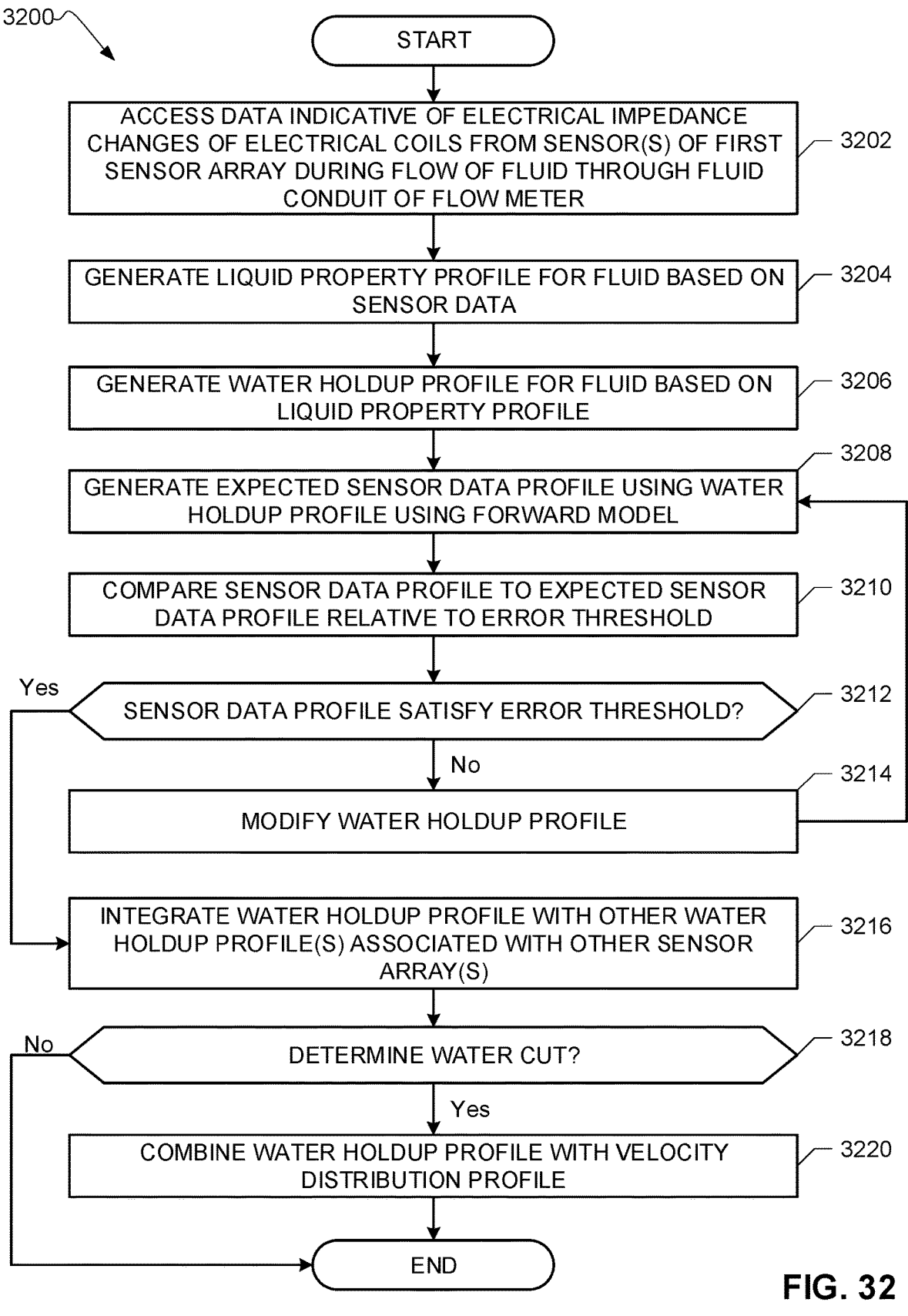

3200

START

ACCESS DATA INDICATIVE OF ELECTRICAL IMPEDANCE CHANGES OF ELECTRICAL COILS FROM SENSOR(S) OF FIRST SENSOR ARRAY DURING FLOW OF FLUID THROUGH FLUID CONDUIT OF FLOW METER — 3202

GENERATE LIQUID PROPERTY PROFILE FOR FLUID BASED ON SENSOR DATA — 3204

GENERATE WATER HOLDUP PROFILE FOR FLUID BASED ON LIQUID PROPERTY PROFILE — 3206

GENERATE EXPECTED SENSOR DATA PROFILE USING WATER HOLDUP PROFILE USING FORWARD MODEL — 3208

COMPARE SENSOR DATA PROFILE TO EXPECTED SENSOR DATA PROFILE RELATIVE TO ERROR THRESHOLD — 3210

Yes

SENSOR DATA PROFILE SATISFY ERROR THRESHOLD? — 3212

No

MODIFY WATER HOLDUP PROFILE — 3214

INTEGRATE WATER HOLDUP PROFILE WITH OTHER WATER HOLDUP PROFILE(S) ASSOCIATED WITH OTHER SENSOR ARRAY(S) — 3216

No

DETERMINE WATER CUT? — 3218

Yes

COMBINE WATER HOLDUP PROFILE WITH VELOCITY DISTRIBUTION PROFILE — 3220

END

FIG. 32

MULTIPHASE FLOW METERS AND RELATED METHODS

CROSS REFERENCE TO RELATED APPLICATION

This application is a National Stage entry of International Patent Application No. PCT/US2020/050658, filed on Sep. 14, 2020.

BACKGROUND

This disclosure relates generally to multiphase fluids and, more particularly, to multiphase flow meters related methods.

DESCRIPTION OF THE RELATED ART

Properties of a multiphase fluid (e.g., including oil, gas, and water) flowing through a pipe, such as phase velocity, water holdup, gas volume fraction (GVF), and water/liquid ratio (WLR), can be used to determine values such as flow rates of the individual phases to characterize the flow regime as the fluid travels along the pipe and to monitor changes in the flow as the fluid travels along the pipe. The multiphase fluid may be flowing through a pipe that is horizontally oriented. In some known examples, combinations of sensors are used to measure a stratified flow through a horizontal flow pipe including, for example, gas and liquid layers. For example, an ultrasonic gas flow meter may be used to measure flow characteristics of the gas phase at an upper portion of a flow pipe and ultrasonic Doppler sensors may be used to measure flow characteristics of the liquid phase at a lower portion of the flow pipe. Some other known examples include vertically mounted flow meters that include vertical pipes to direct the horizontal flow to the vertically mounted flow meters.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

An example apparatus includes a fluid conduit coupled to tubing. A multiphase fluid is to flow from the tubing into the fluid conduit. The example apparatus includes a flow channel defined in the fluid conduit. The fluid is to flow through the flow channel. The flow channel has a cross-sectional shape different from a cross-sectional shape of the tubing. The example apparatus includes one or more sensors coupled to the flow channel to generate data indicative of a property of the multiphase fluid.

Another example apparatus includes a fluid conduit and means for conditioning a flow of a multiphase fluid through the fluid conduit. The means for conditioning is disposed in the fluid conduit. The example apparatus includes a sensor coupled to the means for conditioning. The sensor is to generate sensor data during the flow of the multiphase fluid through the fluid conduit. The example apparatus includes a processor. The sensor is communicatively coupled to the processor. The processor to determine a property of the multiphase fluid based on the sensor data.

Another example apparatus includes a fluid conduit and a channel defined in the fluid conduit. The channel is to provide a flow path for a multiphase fluid. The example apparatus includes a sensor disposed in the fluid conduit. The sensor is to generate sensor data during flow of the multiphase fluid through the channel. The example apparatus includes a processor. The sensor is communicatively coupled to the processor. The processor is to determine a property of the multiphase fluid based on the sensor data.

An example method includes determining, by executing an instruction with a processor, a change in electrical impedance based on first sensor data for a fluid flowing through a flow meter, the first sensor data generated by a first sensor array of the flow meter; generating, by executing an instruction with the processor, a first water holdup profile for the fluid based on the sensor data; integrating, by executing an instruction with the processor, the first water holdup profile with a second water holdup profile to generate an integrated water holdup profile, the second water holdup profile generated based on second sensor data for the fluid, the second sensor data generated by a second sensor array of the flow meter; and determining, by executing an instruction with the processor, a water cut value for the fluid based on the integrated water holdup profile.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended to familiarize the reader with certain aspects and contexts of some embodiments without limitation to the claimed subject matter.

BRIEF DESCRIPTION OF THE DRAWINGS

FIG. 23 illustrates an example sensor having a first sensing zone in accordance with teaching disclosed herein.

FIG. 24 illustrates an example sensor having a second sensing zone in accordance with teaching disclosed herein FIG. 25 illustrates an example sensor array including the example sensor of FIG. 21.

FIG. 26 illustrates another example sensor array including the example sensor of FIG. 21.

FIG. 27 illustrates another example sensor array including the example sensor of FIG. 21.

FIG. 28 is a cross-sectional view of the example sensor array of FIG. 23 taken along the 28-28 line of FIG. 27.

FIG. 32 is a flowchart of another example method that may be executed to implement the example fluid analyzer of FIGS. 1-4, 9, 10, 12, 14 and/or 16.

The figures are not to scale. Wherever possible, the same reference numbers will be used throughout the drawing(s) and accompanying written description to refer to the same or like parts.

DETAILED DESCRIPTION

Figure 1:
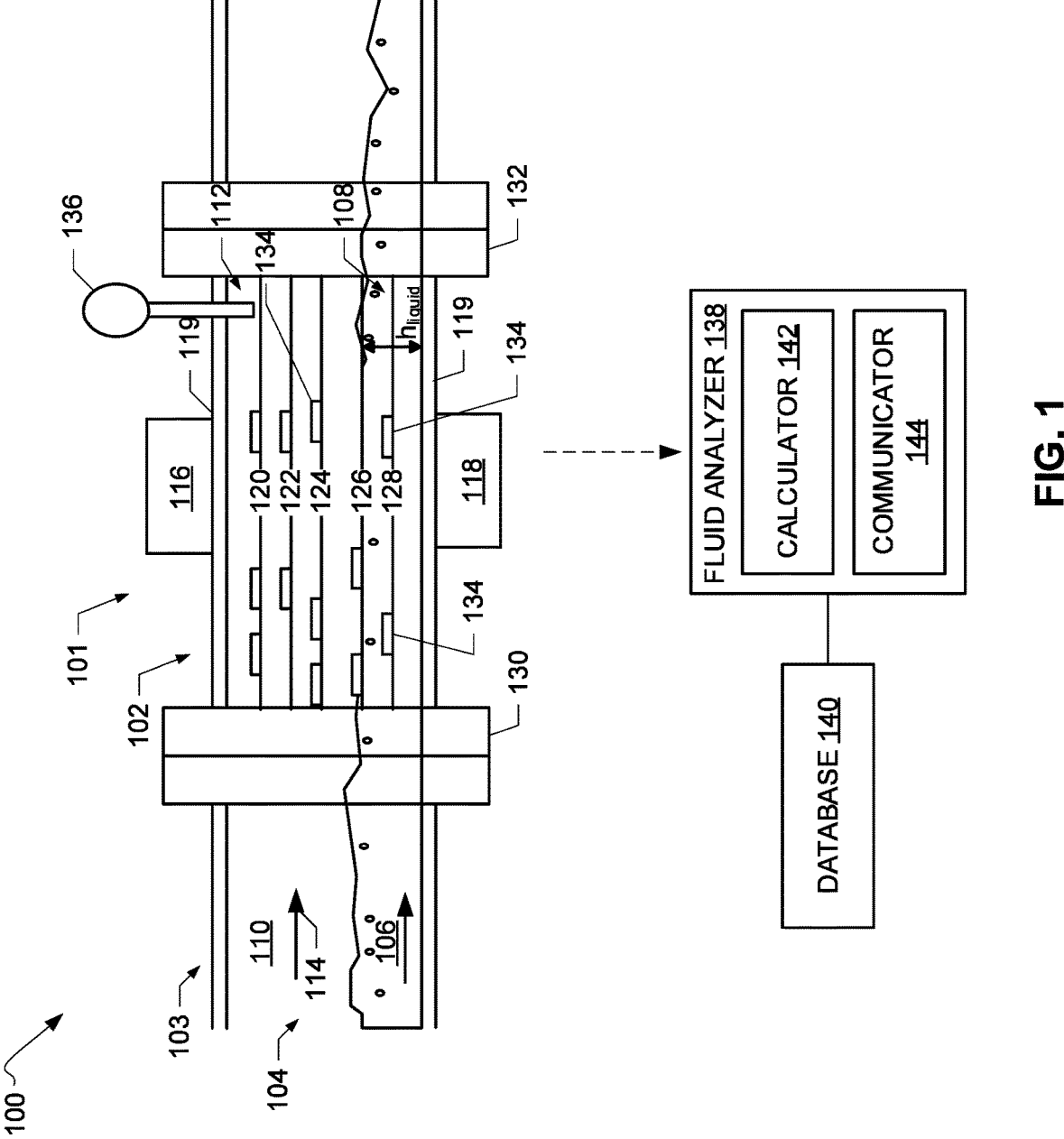
FIG. 1 illustrates an example system including a first example flow meter constructed in accordance with teachings disclosed herein.

It is to be understood that the present disclosure provides many different embodiments, or examples, for implementing different features of various embodiments. Specific examples of components and arrangements are described below for purposes of explanation and to simplify the present disclosure. These are, of course, merely examples and are not intended to be limiting.

In the specification and appended claims: the term "coupled" is used to mean "directly coupled together" or "coupled together via one or more elements." As used herein, the terms "upstream," "downstream," and other like terms indicating relative positions above or below a given point or element are used in this description to more clearly describe some embodiments of the disclosure. Moreover, any use of "horizontal," "downwardly inclined," "vertical," "top," "above," other directional terms, and variations of these terms is made for convenience, but does not mandate any particular orientation of the components.

When introducing elements of various embodiments, the articles "a," "an," and "the" are intended to mean that there are one or more of the elements. The terms "comprising," "including," and "having" are intended to be inclusive and mean that there may be additional elements other than the listed elements.

Fluid produced from an oil well can include multiphase mixtures of gas, oil, and water. Such fluid flows can include stratified flows (e.g., with respective gas and liquid phases) or partially separated flows. Further, the liquid phase can include a mixture of water and oil; in other examples, the liquid phase can include water-continuous (e.g., oil-in-water) or oil-continuous (e.g., water-in-oil) mixtures. The distribution of a gas and liquid, oil and water flow can introduce complexities in measuring values for the fluid such as water holdup, WLR, or water cut (i.e., an amount of water produced as a fraction of a total liquid flow rate), which can affect the accuracy of the measurements obtained using some known water holdup sensors.

Pipes outside the well are typically laid in a horizontal orientation. However, to facilitate mixing between oil and water in a liquid layer of a fluid flow, some known flow meters include vertically oriented pipes to direct the horizontal flow (e.g., upwardly) to a vertical flow, where the flow meter is coupled to the vertical pipe. Example vertically mounted flow meters include sensors disposed about a circumference of the vertical flow pipe. However, the distribution of the gas phase and the liquid phase is typically unpredictable or different in vertical flows (e.g., with the gas phase flowing in a central region of a pipe and liquid phase around the pipe peripheral) as compared to stratified gas-liquid flows in horizontal pipes and downhill or downwardly inclined pipes. Also, the gas phase and the liquid phase of the vertical flow can have different velocity slippage from the horizontal flow. The influence of the gas phase on the liquid phase distribution and that of the flow velocity on the oil and water mixing can result in errors associated with the vertically mounted flow meter with respect to measuring, for instance, water cut using electrical impedance sensors. Further, such known flow meters increase the footprint of the flow meter and installation costs due to the additional vertically oriented piping.

Disclosed herein are example flow meters that provide for measurements of a multiphase fluid flowing in a horizontal or a downwardly inclined fluid conduit (e.g., where "horizontal" refers to an angle of 0° with a range of, for instance, +/−5° and "downwardly inclined" refers to an angle within, for instance, a range of 5°-45° downhill). Example flow meters disclosed herein include one or more sensors disposed in a horizontally mounted or downwardly inclined flow meter that is aligned with the horizontal or downwardly inclined flow path of the fluid flowing through tubing. The sensors of the example flow meters disclosed herein include electrical impedance sensors (e.g., electrodes), differential pressure sensors, and/or ultrasonic sensors. Electrical impedance data (e.g., capacitance, conductance, inductance) can be used to generate a profile of the fluid with respect to, for example, liquid height, liquid holdup values, and liquid velocity profile. The electrical impedance data and/or the data derived therefrom can be used determine water-in-liquid ratios, holdup and flowrates for the liquid phases. The horizontal or downwardly inclined arrangement of the example flow meters disclosed herein enables the flow meters to capture data for the stratified or substantially stratified horizontal or downwardly inclined flows without modifying the orientation of the flow as in known vertically mounted flow meters. Some example flow meters disclosed herein include means for conditioning the flow to facilitate stratification of the gas and liquid layers, or changing a cross-sectional shape of the flow relative to the tubing to increase, for instance, a height of the liquid layer.

Some example flow meters disclosed herein include a plurality of plates having sensors coupled thereto. The plates are disposed in a fluid conduit in line with a flow path of a fluid flowing through piping and serve as means for conditioning the flow as the fluid flows past the plates. Electrical impedance measurements collected across the plates can be used to map a height of the liquid layer in the stratified flow, which can be used to generate fluid flow profiles and determine properties such as liquid holdup values.

Some example flow meters disclosed herein include sensors coupled to (e.g., embedded in) an insert that is disposed in a fluid conduit of the flow meter or is integrally formed with the fluid conduit. The insert (e.g., a plastic insert, a protrusion formed in the flow conduit) defines a flow channel for the fluid to facilitate stratification of the layers of the flow. For example, the insert can include sloped walls to guide the fluid into the channel that is narrower than a diameter of the tubing to which the flow meter is coupled. In some examples, a portion of a cross-section of the channel may have a width that is substantially narrower than a diameter of the tubing (e.g., "V" or "Y" shaped cross-section). The tall and narrow channel facilitates stratification of the flow and results in liquid phase layers having increased thickness as compared to fluid conduits that do not include the insert. The change in cross-section between the fluid conduit and insert eliminate the need for a separator section to stratify the flow before measurements are collected. The stratified fluid flows past the sensors (e.g., electrical impedance array, ultrasonic) coupled to the insert, or means for conditioning the flow, for improved data analysis of the multiphase fluid. Some example flow meters disclosed herein include a flow channel having a sloped floor, thereby facilitating a down-hill flow that enhances stratification.

Some example flow meters disclosed herein include non-contact sensors that detect electrical conductivity or (dielectric) permittivity of the fluid based on magnetic flux generated by a magnetic circuit. Such examples sensors include a core (e.g., a ferrite core) having one or more electrical coils wound about the core. The core is separated from the fluid via an insulator. Application of a current or voltage to the coil(s) generates a magnetic field, which extends into the fluid. Example sensors disclosed herein can detect effects of the magnetic field on the fluid, such as the generation of eddy currents in the fluid. Secondary magnetic fields produced by the eddy current can affect the magnetic flux of the core, which translates to changes in electrical impedance of the coils. The electrical impedance data can be used to determine measurements such as water holdup, water cut, or WLR.

Some example flow meters disclosed herein include absolute or differential pressure sensors to measure differential pressure between a first portion of the primarily horizontal channel (e.g., a top or ceiling of the channel) and a second portion of the channel (e.g., a bottom or floor of the channel). Such differential pressure data can be combined with water cut measurement data to derive the height of the liquid flow layer and, with use of one or more models for stratified flow, to derive the flow rate of the liquid phase.

Some example flow meters disclosed herein include ultrasonic sensor(s) deployed at various location(s) around the flow channel to measure the velocity of the gas phase and that of the liquid phase. Such example sensors can be based on pulsed Doppler principles for measuring velocity profile of the liquid phase.

FIG. 1 illustrates an example system 100 including a multiphase flow meter 101 for measuring horizontal or downhill multiphase flows. The flow meter 101 of FIG. 1 includes a fluid conduit 102 (e.g., a flow pipe) coupled to tubing 103 through which a multiphase fluid 104 flows. In the example of FIG. 1, the fluid conduit 102 is disposed in a substantially horizontal configuration (e.g., at an angle of 0°, within a range of +/−5°). In some other examples, the fluid conduit 102 is disposed in a substantially downhill or downwardly inclined orientation (e.g., between an angle of 5°-45°). The multiphase fluid 104 includes a liquid flow layer 106 flowing along or proximate to a lower portion 108 of the horizontally oriented fluid conduit 102. The multiphase fluid 104 includes a gas flow layer 110 flowing above the liquid flow layer 106 proximate to an upper portion 112 of the fluid conduit 102. In some examples, the multiphase fluid 104 is a substantially stratified flow, or a flow including separate the liquid and gas layers 106, 110 along an interface. The fluid 104 flows from tubing 103 through the fluid conduit 102 in the direction represented by arrow 114 of FIG. 1.

The example flow meter 101 of FIG. 1 includes a first ultrasonic sensor 116 and a second ultrasonic sensor 118 coupled a wall 119 of the fluid conduit 102. In the example of FIG. 1, the first ultrasonic sensor 116 is coupled to the wall 119 proximate to the upper portion 112 of the horizontally oriented fluid conduit 102. Thus, the first ultrasonic sensor 116 is proximate to the gas flow layer 110 when the fluid 104 is flowing through the fluid conduit 102. The first ultrasonic sensor 116 measures a velocity $U_{gas(t)}$ of the gas portion of the fluid 104. The second ultrasonic sensor 118 is coupled to the wall 119 proximate to the lower portion 108 of the horizontally oriented fluid conduit 102. Thus, the second ultrasonic sensor 118 is proximate the liquid flow layer 106 the when the fluid 104 is flowing through the fluid conduit 102. The second ultrasonic sensor 118 measures a velocity $U_{liquid(b)}$ of the liquid portion of the fluid 104. The sensors 116, 118 can include time-of-flight or Doppler sensors. Although in the example of FIG. 1, the sensors 116, 118 are coupled to an exterior of the fluid conduit 102, in other examples, the sensor(s) 116, 118 can be coupled to an interior of the fluid conduit 102.

The example flow meter 101 includes a plurality of plates 120, 122, 124, 126, 128 disposed in an interior of the fluid conduit 102. In the example of FIG. 1, the plates are disposed relative to a longitudinal axis extending through the horizontally oriented fluid conduit 102. For example, the flow meter 101 of FIG. 1 includes a first plate 120, a second plate 122, a third plate 124, a fourth plate 126, and a fifth plate 128. The flow meter 101 can include additional or fewer plates than those illustrated in FIG. 1. The first through fifth plates 120, 122, 124, 126, 128 can be spaced apart relative to each another such that, with respect to the stratified flow of the fluid 104, the first, second, and third plates 120,122, 124 are exposed to the gas flow layer 110 and the fourth and fifth plates 126, 128 are exposed to the liquid flow layer 106. The plates 120, 122, 124, 126, 128 can be made of, for example, a ceramic material or corrosion-resistant (e.g., coated) metallic material.

The example flow meter 101 of FIG. 1 includes an inlet flange 130 and an outlet flange 132. As show in FIG. 1, respective ends of the first through fifth plates 120, 122, 124, 126, 128 are coupled to the inlet flange 130 and the outlet flange 132 (e.g., via mechanical support(s) or fastener(s) such as clamps, screws, flanges, etc.). The flanges 130, 132 allow the fluid 104 to flow through or proximate to the flanges 130, 132 without or without substantial interference.

The plates 120, 122, 124, 126, 128 of the example flow meter 101 of FIG. 1 are flow conditioners in that the plates 120, 122, 124, 126, 128 facilitate conditioning or stratification of the flow of the fluid 104 through the fluid conduit 102. As disclosed herein, the stratification of the flow via the plates 120, 122, 124, 126, 128 improves accuracy in characterizing the fluid flow based on, for example, quantitative measurements such as a water-in-liquid ratio (WLR). The example plates 120, 122, 124, 126, 128 of FIG. 1 serve to substantially straighten (e.g., smooth out) the gas and liquid flow layers 106, 110 of the fluid 104 to reduce turbulent flows in the respective layers 106, 110 and to improve stratification of the flow layers 106, 110.

In addition to conditioning the flow of the fluid 104, the first through fifth plates 120, 122, 124, 126, 128 provide for measurements of electrical impedance (e.g., capacitance and conductance) in combination with the electrically grounded wall 119 of the fluid conduit 102. As discussed herein, the electrical impedance measurements can be used to map a height of the liquid flow layer 106 and determine a value of a water-in-liquid ratio (WLR) for the liquid phase of the fluid 104. In FIG. 1, each of the plates 120, 122, 124, 126, 128 includes one or more sensors (e.g., electrodes, which may have embedded impedance measurement electronics) 134. The sensor(s) 134 can be coupled to one or more portions of the plates(s) 120, 122, 124, 126, 128 (e.g., a surface of the plate such that the sensors are contact electrodes). As mentioned above, the plate(s) 120, 122, 124, 126, 128 can be coated to protect the sensor(s) 134 from the fluid 104 and from erosion and/or corrosion.

The plate(s) 120, 122, 124, 126, 128 including the sensor(s) 134 can serve as driving electrode(s) or detecting electrode(s) for measuring, for example, capacitance and/or conductance. The sensors 134 of any two adjacent plates 120, 122, 124, 126, 128 can measure inter-electrode electrical impedance profiles between the two plates. Intra-plate measurements can be obtained in examples in which the respective plate(s) 120, 122, 124, 126, 128 include two or more sensor(s) 134. In some examples, the sensor(s) 134 of the first plate 120 or the fifth plate 128 (i.e., the plates closest to the wall 119) serve as driving electrode(s). In such examples, the electrically grounded wall 119 of the fluid conduit 102 is used as a detecting or sensing electrode for measuring capacitance and/or conductance.

The example system 100 can include other sensors 136 to measure, for example, one or more properties of the fluid 104 flowing through the fluid conduit 102. For example, the sensor(s) 136 can include a pressure sensor and a temperature sensor.

The example system 100 includes a fluid analyzer 138. In the example of FIG. 1, the electrical impedance measurements generated by the sensor(s) 134 of the plate(s) 120, 122, 124, 126, 128 are transmitted to the fluid analyzer 138 via one or more wired or wireless communication protocols. Also, the gas velocity $U_{gas(t)}$ and the liquid velocity $U_{liquid(b)}$ data generated by the respective first and second ultrasonic sensors 116, 118 are transmitted to the fluid analyzer 138 via one or more wired or wireless communication protocols. The fluid analyzer 138 of the example system 100 of FIG. 1 can be implemented by one or more processors.

The data transmitted to the fluid analyzer 138 is stored in a database 140. The database 140 may be located at the fluid analyzer 138 or located elsewhere and in communication with the fluid analyzer 138. The database 140 stores the electrical impedance data, and the gas and/or liquid velocity data generated by the sensor(s) 116, 118, 134, and the pressure and temperature data generated by the sensor(s) 136. In some examples, the database 140 stores fluid property data (e.g., one or more models of density, viscosity, permittivity, conductivity and/or sound velocity of the gas, oil and water and their mixtures, as a function of pressure, temperature, and measurement frequency).

The fluid analyzer 138 of FIG. 1 includes a calculator 142. The calculator 142 determines a liquid height $h_{liquid}$ of the liquid flow layer 106, a liquid holdup value $\alpha_{liquid}$, and a water holdup value $\alpha_{water}$ based on the electrical impedance data and one or more predefined rules or models stored in database 140 (e.g., based on user inputs). Based on the liquid height $h_{liquid}$, liquid holdup $\alpha_{liquid}$, and/or and water holdup $\alpha_{water}$ value(s), the calculator 142 determines a water-in-liquid ratio (WLR) value for the liquid phase of the fluid 104. In some examples, the calculator 142 processes the electrical impedance measurements from intra-plate sensors within known axial spacing(s) on each of the liquid-covered plate(s) 126, 128, by cross-correlation transit-time analysis, to provide a separate measurement of the liquid velocity $U_{liquid(b)}$.

The calculator 142 uses the data derived from the electrical impedance data (e.g., $\alpha_{liquid}$, WLR) and the gas and liquid velocity data ($U_{gas(t)}$, $U_{liquid(b)}$) to determine a gas volumetric flow rate $Q_{gas}$, a liquid volumetric flow rate $Q_{liquid}$, a water volumetric flow rate $Q_{water}$, and an oil volumetric flow rate $Q_{oil}$ for the fluid 104. The calculator 142 can calculate the respective flow rates as follows:

$$Q_{gas} = f_{gas} \times U_{gas(t)} \times (1 - \alpha_{liquid}) \times A_{pipe}; \qquad (1)$$

$$Q_{liquid} = f_{liquid} \times U_{liquid(b)} \times \alpha_{liquid} \times A_{pipe}; \qquad (2)$$

$$Q_{water} = Q_{liquid} \times WLR; \text{ and} \qquad (3)$$

$$Q_{oil} = Q_{liquid} \times (1 - WLR); \qquad (4)$$

where A is a cross-sectional area of the fluid conduit 102 and $f_{gas}$ and $f_{liquid}$ are gas and liquid velocity-profile correction factors. The correction factors $f_{gas}$ and $f_{liquid}$ can be defined as:

$$f_{gas} = U_{gas(mean)}/U_{gas(t)}; \text{ and} \qquad (5)$$

$$f_{liquid} = U_{liquid(mean)}/U_{liquid(b)}. \qquad (6)$$

The values of the correction factors $f_{gas}$ and $f_{liquid}$ can be determined experimentally or through flow modeling. The correction factors $f_{gas}$ and $f_{liquid}$ can be a function of, for instance, gas or liquid holdup values and/or gas or liquid flow Reynolds numbers, respectively.

In the example of FIG. 1, the resolution of the measurements determined by the fluid analyzer 138 is proportional to the number of plates 120, 122, 124, 126, 128 (and, thus, the number of sensor(s) 134) disposed in the fluid conduit 102. In the examples in which the fluid conduit 102 includes a fewer number of plates, the measurement resolution is lower than examples in which a greater number of plates are disposed in the fluid conduit 102.

The example fluid analyzer 138 of FIG. 1 includes a communicator 144. The communicator 144 transmits the value(s) determined by the calculator 142 such as flow rate, liquid holdup, and WLR to, for example, one or more other processors, one or more display devices, etc., in wired or wireless communication with the fluid analyzer 138. The communicator 144 can transmit the value(s) for output based on, for instance, user setting(s) received at the fluid analyzer 138.

Figures 2, 3:
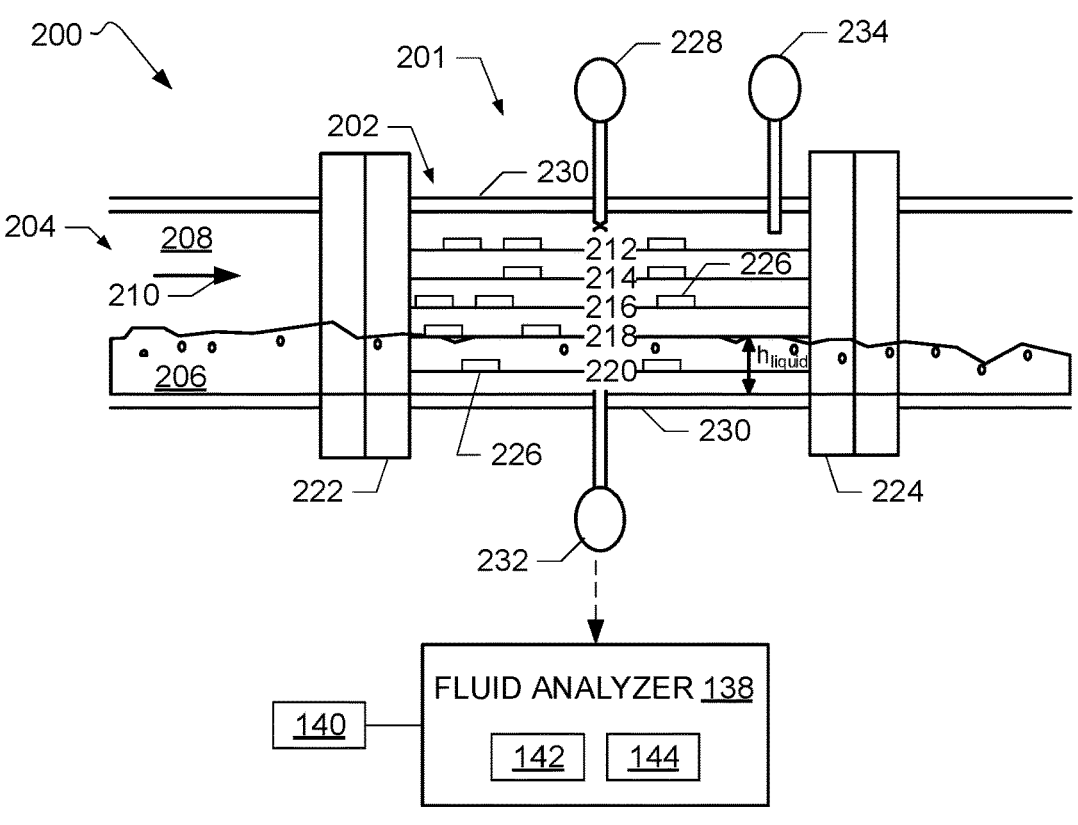
FIG. 2 illustrates an example system including another example flow meter constructed in accordance with teachings disclosed herein.
FIG. 3 illustrates an example system including another example flow meter constructed in accordance with teachings disclosed herein.

FIG. 2 is another example system 200 including a flow meter 201 and a plurality of plates disposed in a fluid conduit 202 of the flow meter 201, substantially as disclosed in connection with FIG. 1. In the example of FIG. 2, a multiphase fluid 204 including a liquid flow layer 206 and a gas flow layer 208 flows through the fluid conduit 202 in the direction of arrow 210 of FIG. 2.

The example flow meter 201 of FIG. 2 includes a first plate 212, a second plate 214, a third plate 216, a fourth plate 218, and a fifth plate 220 disposed in the fluid conduit 202 along a longitudinal axis of the fluid conduit 202. The plates 212, 214, 216, 218, 220 are supported by inlet and outlet flanges 222, 224, substantially as discussed above in connection with FIG. 1. The respective plates 212, 214, 216, 218, 220 include sensor(s) 226 to measure electrical impedance (e.g., capacitance, conductance) as the fluid 204 flows past the plates.

The example system 200 of FIG. 2 includes a first Pitot tube 228 coupled to the fluid conduit 202 of the flow meter 201. As shown in FIG. 2, the first Pitot tube 228 extends through a wall 230 of the fluid conduit 202 proximate to the first plate 212 (e.g., at a top side of the horizontally disposed fluid conduit 202). The first Pitot tube 228 includes a first opening facing the flow of the fluid 204 in the fluid conduit 202 and a second opening oriented opposite the flow of the fluid 204 (e.g., back-facing the flow). The first Pitot tube 228 measures impact pressure $\Delta P_{gas}$ and static pressure $P_{gas}$ of the gas flowing proximate to the first plate 212.

The example system 200 of FIG. 2 includes a second Pitot tube 232 coupled to the fluid conduit 202 of the flow meter 201. As shown in FIG. 2, the second Pitot tube 232 extends through the wall 230 of the fluid conduit 202 proximate to the fifth plate 220 (e.g., proximate to a lower portion of the horizontally oriented fluid conduit 202). The second Pitot tube 232 includes a first opening facing the flow of the fluid 204 in the fluid conduit 202 and a second opening oriented opposite the flow of the fluid 204 (e.g., back-facing the flow). The second Pitot tube 232 measures impact pressure $\Delta P_{liquid}$ and static pressure $P_{liquid}$ of the liquid flowing proximate to the fifth plate 220.

As mentioned above in connection with FIG. 1, the example system 200 can include other sensors to measure properties of the fluid 204. In the example of FIG. 2, the system 200 includes a temperature sensor 234 to measure fluid temperature during flow of the fluid 204 through the fluid conduit 202.

The example system 200 of FIG. 2 includes the fluid analyzer 138 of FIG. 1. In the example of FIG. 2, the sensors 226 of the respective plates 212, 214, 216, 218, 220 transmit electrical impedance data to the fluid analyzer 138. Also, the first and second Pitot tubes 228, 232 transmit pressure data (e.g., impact pressure $\Delta P_{gas}$, $\Delta P_{liquid}$, static pressure $P_{gas}$, $P_{liquid}$) to the fluid analyzer 138. Data generated by the temperature sensor(s) 234 is also transmitted to the fluid analyzer 138. The data from the sensor(s) 226, 228, 232, 234, is stored in the database 140 associated with the fluid analyzer 138.

In the example of FIG. 2, the calculator 142 of the fluid analyzer 138 determines the velocity $U_{gas(t)}$ of the gas of the fluid 204 based on the impact pressure $\Delta P_{gas}$ measured by the first Pitot tube 228 as follows:

$$U_{gas(t)} \approx \left(2 \times \Delta P_{gas}/\rho_{gas}\right)^{1/2}. \tag{7}$$

In Equation 7, the gas density $\rho_{gas}$ can be determined using a model stored in the database 140 and based on the static gas pressure $P_{gas}$ measured by the first Pitot tube 228 and the fluid temperature T measured by the temperature sensor 234.

In the example of FIG. 2, the calculator 142 determines the velocity $U_{liquid(b)}$ of the liquid of the fluid 204 based on the impact pressure $\Delta P_{liquid}$ measured by the second Pitot tube 232 as follows:

$$U_{liquid(b)} \approx \left(2 \times \Delta P_{liquid}/\rho_{liquid}\right)^{1/2}. \tag{8}$$

In Equation 8, the liquid density $\rho_{density}$ can be determined as follows:

$$\rho_{liquid} = WLR \times \rho_{water} + (1\text{-}WLR) \times \rho_{oil}. \tag{9}$$

In Equation 9, the WLR local to the second Pitot tube 232 can be determined from the electrical impedance measured by the sensor(s) 226 of the fifth plate 220. The oil density $\rho_{density}$ and the water density $\rho_{water}$ can be determined using model(s) stored in the database 140 based on static pressure $P_{liquid}$ measured by the second Pitot tube 232 and the fluid temperature measured by the temperature sensor 234. The calculator 142 can process the electrical impedance measurements from intra-plate sensors with known axial spacing(s) on each of the liquid-covered plate(s) 218, 220, by cross-correlation transit-time analysis, to provide a separate measurement of the liquid velocity $U_{liquid(b)}$.

The calculator 142 of the example fluid analyzer 138 determines a liquid height $h_{liquid}$ of the liquid flow layer 206, a liquid holdup value $\alpha_{liquid}$, and a water holdup value $\alpha_{water}$ based on the electrical impedance data and one or more predefined models stored in the database 140. Based on the liquid height $h_{liquid}$ and/or liquid holdup $\alpha_{liquid}$ and water holdup $\alpha_{water}$ value(s), the calculator 142 determines the WLR ($=\alpha_{water}/\alpha_{liquid}$) value for the liquid phase of the fluid 204. The calculator 142 of the fluid analyzer 138 can determine the gas, liquid, water, and oil volumetric flow rates based on the gas and liquid velocities $U_{gas(t)}$, $U_{liquid(b)}$ and Equations 1-6, above.

FIG. 3 is another example system 300 including a flow meter 301 and a plurality of plates disposed in a fluid conduit 302 of the flow meter 301, substantially as disclosed in connection with FIGS. 1 and 2. In the example of FIG. 3, a multiphase fluid 304 including a liquid flow layer 306 and a gas flow layer 308 flows through the fluid conduit 302 in the direction of arrow 310 of FIG. 3.

The example flow meter 301 includes a first plate 312, a second plate 314, a third plate 316, a fourth plate 318, and a fifth plate 320 disposed in the fluid conduit 302 along a longitudinal axis of the fluid conduit 302. Respective ends of the plates 312, 314, 316, 318, 320 are coupled to an inlet flange 322 (e.g., via mechanical support(s) coupled to the inlet flange 322) and a support 324 disposed upstream of an outlet flange 325 of the flow meter 301. The inlet flange 322 and the support 324 allow the fluid 304 to flow through the fluid conduit 302 without substantial interference. In some examples, the plates 312, 314, 316, 318, 320 of FIG. 3 include sensors 326 to measure, for instance, electrical impedance (e.g., capacitance, conductance) as the fluid 304 flows past the plates.

The example system 300 of FIG. 3 includes a first ultrasonic (e.g., time-of-flight) sensor 328 and a second ultrasonic (e.g., Doppler) sensor 330 coupled to a wall 332 of the fluid conduit 302. In the example of FIG. 3, the first ultrasonic sensor 328 is coupled to the wall 332 proximate an upper portion 334 of the horizontally oriented fluid conduit 302, or a region of the fluid conduit 302 through which the gas flow layer 308 of the fluid 304 flows. The first ultrasonic sensor 328 measures a velocity $U_{gas(t)}$ of the gas of the fluid 304. The second ultrasonic sensor 330 is coupled to the wall 332 proximate to a lower portion 336 of the horizontally oriented fluid conduit 302, or a region of the fluid conduit 302 through which the liquid flow layer 306 of the fluid 304 flows. The second ultrasonic sensor 330 measures a velocity $U_{liquid(t)}$ of the liquid of the fluid 304. The example of FIG. 3 can include additional sensors 328, 330 than shown in FIG. 3.

As compared to FIG. 1, in the example of FIG. 3, the first and second ultrasonic sensors 328, 330 are disposed downstream of the plates 312, 314, 316, 318, 320. Thus, a length of plates 312, 314, 316, 318, 320 and/or locations of the inlet flange 322 and/or the support 324 that support the plates 312, 314, 316, 318, 320 may be adjusted relative to the example of FIG. 1 to accommodate the placement of the ultrasonic sensors 328, 330 downstream of the plates 312, 314, 316, 318, 320. The example system 300 can include other sensors 333 to measure, for example, fluid pressure and/or temperature during flow of the fluid 304 through the fluid conduit 302.

The example system 300 of FIG. 3 includes the fluid analyzer 138 of FIG. 1. In the example of FIG. 3, the calculator 142 uses the data generated by the second ultrasonic (e.g., Doppler) sensor 330 to determine a height of the liquid $h_{liquid}$ and the velocity $U_{liquid(t)}$ of the liquid. The calculator 142 determines a liquid height $h_{liquid}$ of the liquid flow layer 306, a liquid holdup value $\alpha_{liquid}$, and a water holdup value $\alpha_{water}$ based on the electrical impedance data and one or more predefined models stored in the database 140. Based on the liquid height $h_{liquid}$ and/or liquid holdup $\alpha_{liquid}$ and water holdup $\alpha_{water}$ value(s), the calculator 142 determines the WLR value for the liquid phase of the fluid 304. The calculator 142 can determine the height of the liquid independent of electrical impedance data collected by the sensor(s) 326 of the plate(s) 312, 314, 316, 318, 320. Thus, in the example of FIG. 3, the calculator 142 can determine, for instance, the gas and/or liquid volumetric flow rates $Q_{gas}$, $Q_{liquid}$ without use of the gas and liquid velocity-profile correction factors $f_{gas}$ and $f_{liquid}$ used in connection with Equations 1, 2, 5, and 6, above.

Thus, FIGS. 1-3 illustrate different examples for conditioning flow via the plate(s) 120, 122, 124, 126, 128, 212, 214, 216, 218, 220, 312, 314, 316, 318, 320 and collecting fluid measurements via the sensor(s) 134, 226, 326 of the plate(s) and/or the sensor(s) 116, 118, 136, 228, 232, 234, 328, 330, 333 coupled to the fluid conduit 102, 202, 302. As shown in FIGS. 1 and 3, in some examples, the sensors coupled to the fluid conduit 102, 302 can include ultrasonic sensors 116, 118, 328, 330 that are non-intrusive with respect to the wall 119, 332 of the fluid conduit 102, 302. In other examples, as shown in FIG. 2, the sensors can include Pitot tubes 228, 232 that intrude through the wall 230 of the fluid conduit 202. In other examples, the Pitot tubes 228, 232 shown in FIG. 2 may be installed at the downstream of flow-conditioning and impedance sensors plates to replace the ultrasonic sensors 328, 330 shown in FIG. 3 to make gas velocity and liquid velocity measurements.

FIGS. 1-3 illustrate a first example means for conditioning fluid flowing through a flow meter, namely, the plate(s) 120, 122, 124, 126, 128, 212, 214, 216, 218, 220, 312, 314, 316, 318, 320 disposed in the fluid conduit 102, 202, 302. FIGS. 4-19 illustrate a second example means for conditioning fluid flow, including an insert in a fluid conduit to define a flow channel for a multiphase fluid. As disclosed herein, the flow channel defined by the insert facilitates stratification of the fluid during flow through the fluid conduit.

Figure 4:
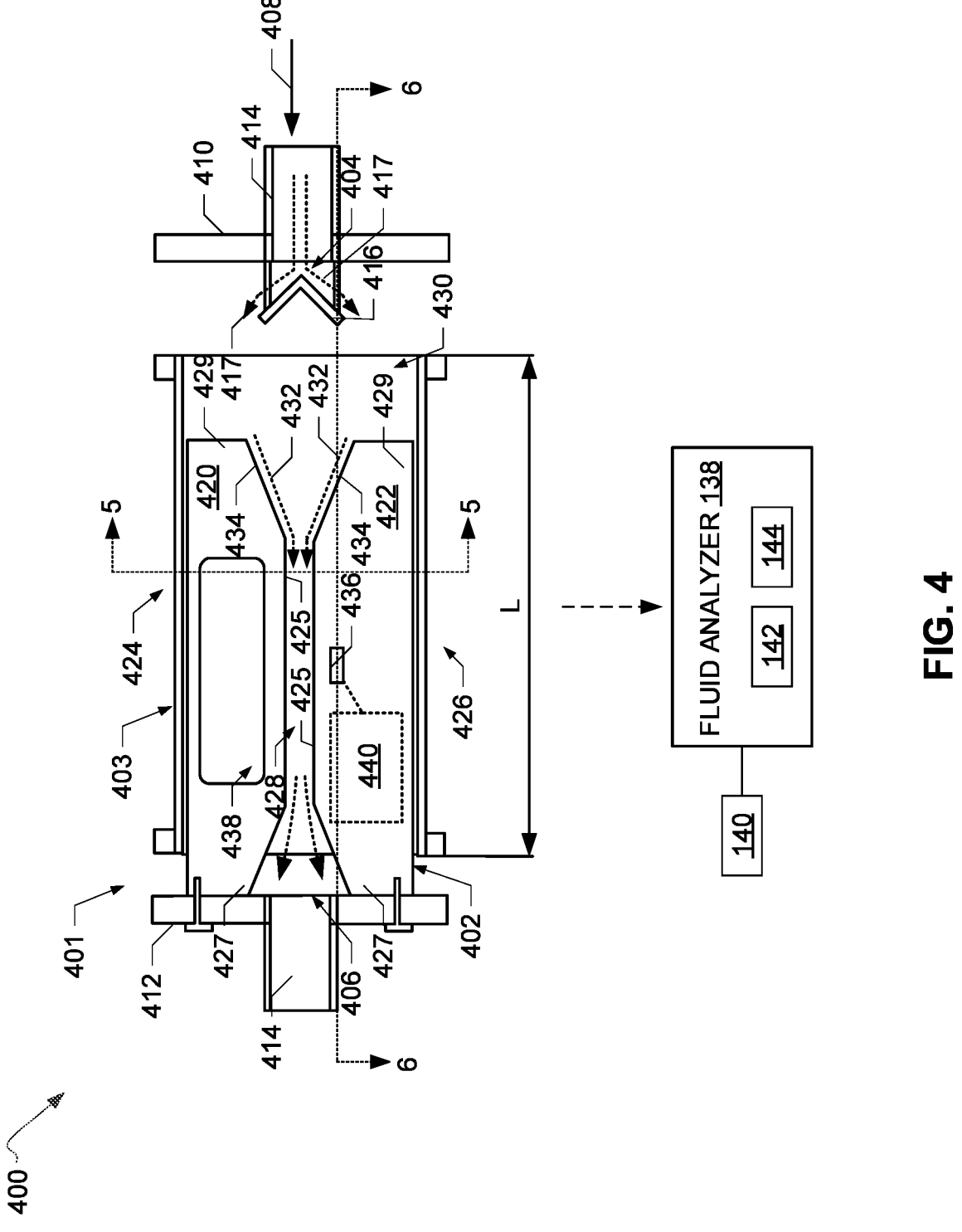
FIG. 4 illustrates an example system including another example flow meter constructed in accordance with teachings disclosed herein.

FIG. 4 illustrates an example system 400 including a substantially horizontally oriented flow meter 401 including an insert 402 disposed in a fluid conduit 403 of the flow meter 401. The insert 402 of FIG. 4 defines a flow channel for a multiphase fluid flowing through the flow meter 401. The insert 402 can be formed separate from the fluid conduit 403 and coupled thereto (e.g., mechanically coupled thereto) or formed integrally with a portion of the fluid conduit 403 through forging, casting, molding, etc. The fluid conduit 403 has an inlet 404 and an outlet 406 through which a multiphase fluid flows, as represented by arrow 408 of FIG. 4. In the example of FIG. 4, the fluid conduit 403 is disposed in a substantially horizontal configuration (e.g., at an angle of 0°, within a range of)+/–5°. In some other examples, the fluid conduit 403 is disposed in a substantially downhill or downwardly inclined orientation (e.g., between an angle of 5°-45°). For illustrative purposes, a top cross-sectional view of the fluid conduit 403 is shown in FIG. 4.

The fluid conduit 403 includes a first flange 410 disposed proximate to the inlet 404 of the fluid conduit 403 and a second flange 412 disposed proximate to the outlet 406 of the fluid conduit 403. In the example of FIG. 4, the fluid conduit 403 has a diameter greater than a diameter of a pipe 414 to which the flow meter 401 is coupled. The first and second flanges 410, 412 facilitate coupling of the pipe 414 to the flow meter 401. For example, a diameter of orifices of the flanges 410, 412 can be the same size as a diameter of the pipe 414 or within a tolerance range relative to the diameter of the pipe 414.

In the example of FIG. 4, a buffer 416 is disposed at the inlet 404 to direct the fluid flow towards the sides of the fluid conduit 403, as shown by arrows 417. The change in the direction of fluid flow by the buffer 416 helps reduce an impact of liquid slugs. In some examples, a buffer is disposed at the outlet 406 to divert the flow sideways to reduce back flow of the fluid into the fluid conduit 403. In further examples, the buffer can be structured to guide the heavier liquid phases sideways, while guiding the lighter gas phase upwards to accelerate gas/liquid stratification.

The example insert 402 can be made of one or more insert portions. In the example of FIG. 4, the insert 402 includes a first insert portion 420 and a second insert portion 422 spaced apart from the first insert portion. As illustrated in FIG. 4, the first insert portion 420 is disposed proximate to a first side 424 of the fluid conduit 403 and the second insert portion 422 is disposed proximate to a second side 426 of the fluid conduit 403. In the example of FIG. 4, the first and second insert portions 420, 422 are symmetrical to one another. The first and second insert portions 420, 422 define a channel 428 between the insert portions 420, 422.

Respective ends 427 of first and second insert portions 420, 422 can be coupled to the second flange 412 via one or more mechanical fasteners (e.g., clamps, screws). During assembly, the first and second insert portions 420, 422 can be coupled to the second flange 412 and slid into the fluid conduit 403 when the fluid conduit 403 is coupled to the pipe 414 via the flanges 410, 412. In some examples, respective ends 429 of the first and second insert portions 420, 422 opposite the ends 427 are mechanically coupled to the first flange 410.

The example insert 402 including the insert portions 420, 422 can be made of a material such as plastic, including high temperature polyvinyl chloride (PVC) or polyetheretherketone (PEEK). The insert 402 can be formed using methods such as casting, molding, 3D printing, etc. In some examples, one or more portions of sidewalls 425 of the insert 402 (e.g., channel facing walls) are coated with a hydrophobic material, such as a Teflon-like material including ethylene tetrafluoroethylene (ETFE).

As illustrated in FIG. 4, a length of the respective insert portions 420, 422 is less than a length L of the fluid conduit 403 (e.g., where the length L of the fluid conduit 403 is less than 1 m (e.g., between 0.4 and 0.8 m). The fluid conduit 403 includes a settling chamber 430 defined in an area of the fluid conduit 403 between the inlet 404 (e.g., proximate to the buffer 416) and the insert 402 (i.e., the first and/or second insert portions 420, 422). As fluid flows from the pipe 414 through the inlet 404 and around the buffer 416, the fluid accumulates in the settling chamber 430 before flowing through the channel 428. A size and/or shape of the settling chamber 430 can differ from the example of FIG. 4. The accumulation of the fluid in the settling chamber 430 and the design parameters such as the volume of the settling chamber 430 further affect the flow conditions as part of the flow conditioning by the flow meter 401.

The channel 428 of FIG. 4 defined by the insert portions 420, 422 converts the flow cross-section from a circular shape (e.g., based on the circular shape of the pipe 414) to a narrow and tall shape (e.g., relative to a diameter of the pipe 414). Put another way, a cross-sectional shape of the channel 428 is different from a cross-sectional shape of the pipe 414. A cross-section of the channel 428 can have, for instance, a rectangular shape, a V shape, a trapezoidal shape (where the trapezoidal shape is shown for example in FIG. 5 below) or other shapes. As shown by arrows 432 of FIG. 4, the fluid flows from the settling chamber 430 into the channel 428, where the flow is shaped or converged to follow the shape of the channel 428. As illustrated in FIG. 4, the ends 429 of the first and second insert portions 420, 422 have sloped walls 434. In some examples, sloped walls 434 are formed at the ends 427, 429 of the insert portions 420, 422 proximate to upstream and downstream flows to provide for gradual narrowing of the channel 428 at the upstream flow and gradual widening of the channel at the downstream flow. The gradual transition provided by the sloped walls 434 reduces turbulence as compared to walls having sharp edges and/or any other abrupt change in cross-sectional or shape as the fluid exits the channel 428.

In the example of FIG. 4, the channel 428 facilitates further stratification of the fluid flow. For example, the trapezoidal shape of the channel 428 increases a thickness of a liquid layer of the fluid and the thickness of the gas layer based on the profile of the trapezoidal shape. As the fluid is diverted into the channel 428, a thickness of the liquid layer and the gas layer increases due to the narrow, tall channel, which facilitates improved accuracy in measurement of fluid flow properties.

In the example of FIG. 4, one or more sensors 436 are coupled to the insert 402 (e.g., embedded in the first and/or second insert portions 420, 422, attached to one or more surface(s) of the respective first and/or second insert portions 420, 422). In some examples, the insert portions 420, 422 define openings 438 proximate to the flow channel 428 to receive the sensor(s) 436. The sensor(s) 436 measure one or more properties of the fluid flow along, for instance, a vertical height of the channel 428 (in examples where the fluid conduit 403 is disposed in a downwardly inclined orientation, the vertical height of the channel 428 refers to a direction normal to the flow direction). The sensor(s) 436 can be disposed along one or both sides of the channel 428 (e.g., in the first and/or second insert portions 420, 422). The number and type(s) of sensor(s) 436 can be based on particular fluid properties to be measured. Data generated by the sensor(s) 436 can be transmitted to, for instance, the fluid analyzer 138 for processing and analysis. In some examples, one or more electronic circuits 440 for interfacing between the sensor(s) 436 and the fluid analyzer 138 are coupled to insert portion(s) 420, 422. Thus, in addition to directing the fluid flow to have a particular cross-sectional shape via the channel 428, the insert 402 provides a housing for the sensor(s) 436 and the electronic circuits 440 to monitor flow of the fluid through the channel 428.

For example, to measure a water-in-liquid ratio (WLR), the insert 402 can include an array of sensor(s) 436 to measure electrical impedance, including capacitance, conductance, inductance, and/or microwave transmission/reflection sensor arrays. The electrical impedance sensor array can measure water holdup distribution (vertically) across the liquid layer. The example calculator 142 of the fluid analyzer 138 inverts the water holdup distribution to determine a WLR value for the flow in examples where, for instance, the liquid phase is substantially well mixed and/or has a substantially uniform velocity profile along a height of the liquid (e.g., homogenous liquid flows, non-turbulent flows). in examples in which the liquid phase is not substantially well mixed and/or the does not have a substantially uniform velocity profile (e.g., turbulent flows), the insert portion(s) 420, 422 can include additional sensors to generate vertical velocity distribution data across the liquid layer.

Figure 5:
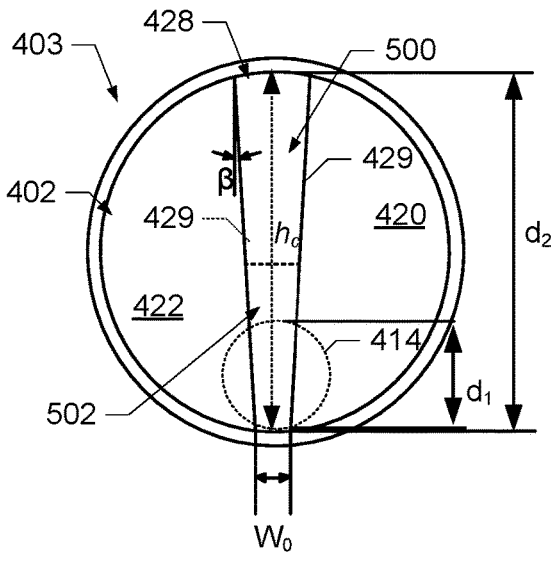
FIG. 5 is a front view of a fluid conduit that may be used with the example flow meter of FIG. 4 taken along the 5-5 line of FIG. 4.

FIG. 5 is a front view of the example fluid conduit 403 taken along the 5-5 line of FIG. 4. As represented in FIG. 5, an inner diameter $d_2$ of fluid conduit 403 is greater than an inner diameter $d_1$ of the pipe 414 (FIG. 4) that interfaces with the fluid conduit 403 at the inlet 404 and the outlet 406 of the fluid conduit 403 (e.g., via the flanges 410, 412 of FIG. 4). For example, the diameter $d_1$ of the pipe 414 (FIGS. 4, 6) can be 3 inches and the diameter $d_2$ of the fluid conduit 403 can range from 6-24 inches. In the example of FIGS. 4 and 5, a cross-sectional area of the channel 428, $A_2$, is equal to or greater than a cross-sectional area of the pipe, $A_1 = \pi d_1^2 /$ 4, where a ratio $A_2/A_1$ between the cross-sectional area of the channel 428 and the pipe 414 is between 1 and 10.

As shown in FIG. 5, the stratified flow of the fluid through the channel 428 includes a gas flow layer 500 and a liquid flow layer 502. In the example of FIG. 5, a width of the channel 428 can be defined by a ratio of a liquid cross-sectional area to a height of the liquid flow layer 502, i.e., $W_{liq}=A_{liq}/h_{liq}$. The width $W_{liq}$ of the channel 428 is smaller than the diameter $d_1$ of the pipe 414. For example, a ratio of the width $W_{liq}$ of the channel 428 to the diameter $d_1$ of the pipe 414 can be between 0.05 and 0.8. Also, a height $h_c$ of the channel 428 is greater than the diameter $d_1$ of the pipe 414. For example, a ratio $h_c/d_1$ of the height of the channel 428 to the diameter of the pipe 414 can be between 2 and A shape of the cross-section of the channel 428 can be adjusted based on a cutting angle $\beta$ of the insert 402 and a width $W_0$ of a narrowest portion of the channel 428. In examples where the insert 402 includes the two insert portions 420, 422, the cutting angle $\beta$ can be the angle of the respective sidewalls of the insert portions 420, 422 (e.g., the sidewalls 425 of FIG. 4). When $\beta=0°$, the channel cross section may be rectangular and when $\beta>0°$, the channel cross section has a trapezoidal shape. In some examples, the angle $\beta$ is between $0°\leq\beta\leq30°$. The width $W_0$ of the narrowest portion of the channel 428 can be between, for instance, 3 mm to 30 mm.

Figure 6:
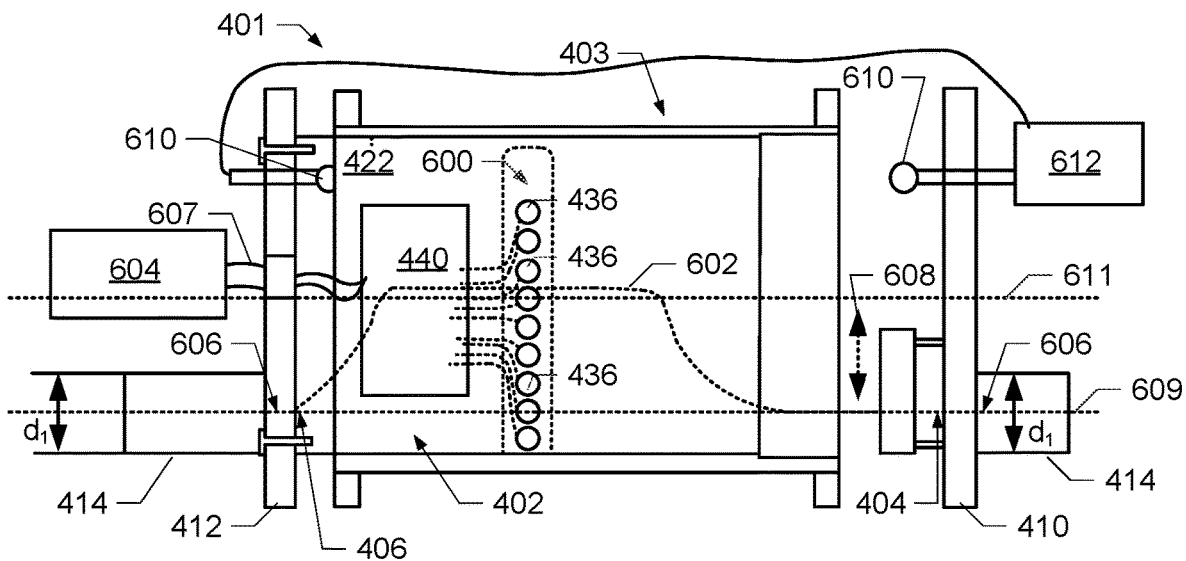
FIG. 6 is a cross-sectional view of the example flow meter of FIG. 4 taken along the 6-6 line of FIG. 4.

FIG. 6 is a cross-sectional view of the example flow meter 401 and the pipe 414 taken along the 6-6 line of FIG. 4. For illustrative purposes, FIG. 6 shows the second insert portion 422 of the insert 402 with the understanding that the first insert portion 420 can include the same or substantially similar components (e.g., the sensor(s) 436). In the example of FIG. 6, the second insert portion 422 includes an array 600 including the sensor(s) 436. The array 600 can include additional or fewer sensors than the example of FIG. 6. As shown in FIG. 6, some of the sensor(s) 436 are disposed along a height of the liquid flow layer in the channel 428, as represented by dashed line 602 in FIG. 6. Other ones of the sensor(s) 436 measure the properties of the gas flow layer (e.g., the sensor(s) coupled to the insert portion 422 at a height above the liquid flow layer).

As shown in FIG. 6, the electronic circuit 440 is communicatively coupled to the sensor(s) 436 of the array 600. In the example of FIG. 6, the (e.g., first) electronic circuit 440 is also communicatively coupled to a second electronic circuit 604 disposed external to the fluid conduit 403. For instance, the first electronic circuit 440 can be communicatively coupled to the second electronic circuit 604 via a cable 607 extending through the second flange 412. Data generated by the sensor(s) 436 can be processed by the first and/or second electronic circuits 440, 604 before being transmitted to the fluid analyzer 138 for analysis. The communicative couplings between the sensor(s) 436 and the electronic circuits 440, 604 can be based on one or more wired and/or wireless communication protocols.

As shown in FIG. 6, the flanges 410, 412 include openings 606 that align with the pipe 414 at the inlet 404 and the outlet 406 of the fluid conduit 403. A diameter of the opening(s) 606 of the flanges 410, 412 can be substantially equal to the diameter $d_1$ of the pipe 414. As represented by arrow 608 in FIG. 6, a central longitudinal axis 609 passing through the pipe 414 and the openings 606 of the flanges 410, 412 is eccentrically located (e.g., not coaxially aligned) with respect to a central longitudinal axis 611 extending through the fluid conduit 403.

In the example of FIG. 6, one or more sensors 610 are coupled to the first and/or second flanges 410, 412 to collect additional data associated with the fluid flow before and/or after the fluid enters the channel 428. The sensor(s) 610 coupled to the flange(s) 410, 412 can include temperature sensor(s), pressure sensor(s), differential pressure sensor(s), salinity sensor(s), gas flow sensor(s) (e.g., ultrasonic gas transducer(s)), etc. The sensor(s) 610 of the flange(s) 410, 412 are communicatively coupled to a third electronic circuit 612 that provides an interface with, for instance, the fluid analyzer 138 of FIG. 4. The sensor(s) 610 can be located elsewhere relative the fluid conduit 403 in addition to or alternatively to the flange(s) 410, 412. For examples, the sensor(s) 610 can also be located at the insert portion(s) 420, 422.

Figure 7:
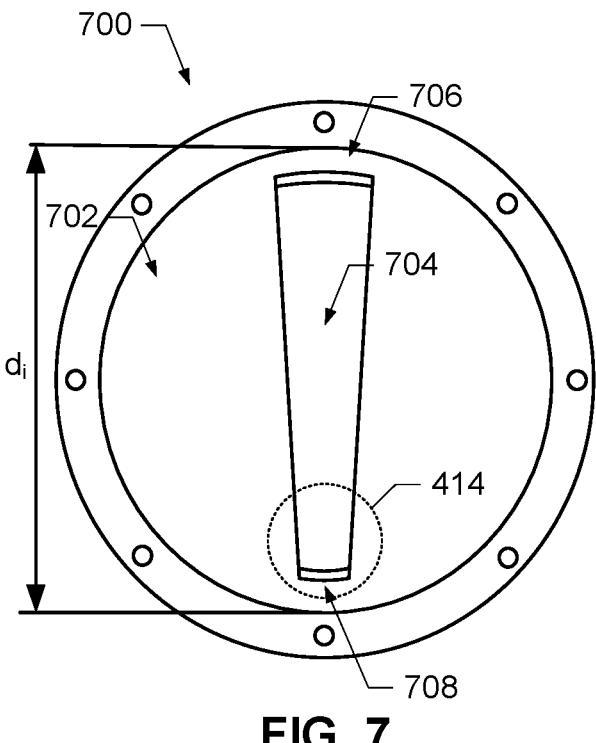
FIG. 7 is a front view of another example fluid conduit that may be used with the example flow meter of FIG. 4.

FIG. 7 is a front view of another example fluid conduit 700 that can be used with the example flow meter 401 of FIG. 4. The example fluid conduit 700 includes an insert 702 disposed therein to promote stratification of a fluid flowing through the fluid conduit 700. As compared to the insert 402 of FIGS. 4-6, which is formed from the first and second insert portion 420, 422, the insert 702 of FIG. 7 is an integrated structure including a channel 704 defined therein (e.g., via extrusion). As shown in FIG. 7, a region 706 of the insert 702 is disposed above the channel 704 and a region 708 of the insert 702 is disposed below the channel 704. As also shown in FIG. 7, an inner diameter $d_1$ of the fluid conduit 700 is greater than a diameter of the pipe 414 aligned therewith.

Figure 8:
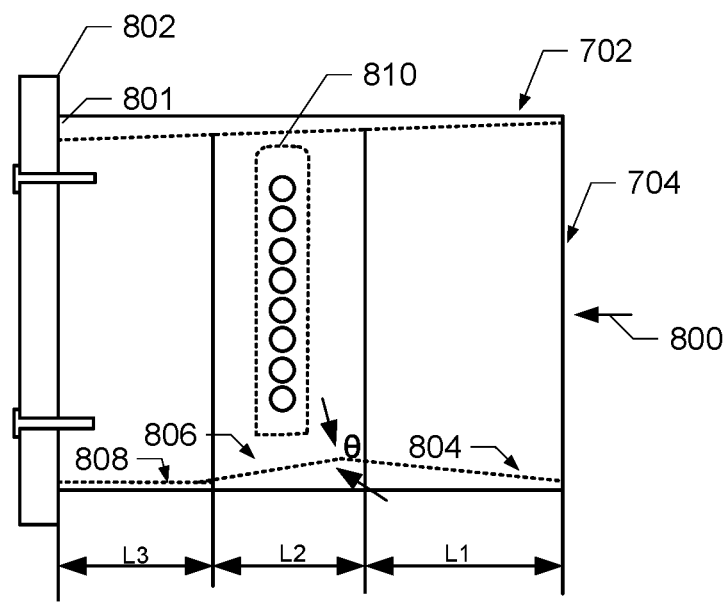
FIG. 8 is a side view of the example fluid conduit of FIG. 7.

FIG. 8 is a side view of the example fluid conduit 700. A fluid flowing through the channel 704 flows in the direction of arrow 800 of FIG. 8. An end 801 of the insert 702 is coupled to a flange 802 via one or more mechanical fasteners. In the example of FIGS. 7 and 8, a tolerance between an outer diameter of the insert 702 and the inner diameter of the fluid conduit 700 does not need to be rigidly defined because fluid leakage is controlled by the sealing of the flange 802 and an end of the insert 702.

In the example of FIGS. 7 and 8, a downhill fluid flow through the channel can be created via the insert 702, which is sloped. In the example of FIG. 8, the insert 702 includes a first portion 804, a second portion 806, and a third portion 808. The second portion 806 of the insert 702 has a downhill angle $\theta$ and a length $L_2$ relative to the other portions 804, 808 of the insert 702 having respective lengths $L_1$, $L_3$. The downhill flow at the second portion 806 facilitates stratification of the gas and liquid phases of the fluid. For example, the downhill angle $\theta$ can be between 0 and 30 degrees and the length of $L_2$ of the second portion 806 can be between 100 and 700 mm. The length $L_2$ of the second portion 806 can have different lengths. In some examples, the length $L_2$ of the second portion 806 is greater than the lengths $L_1$, $L_3$ of the first and third portions 804, 808. The insert 702 can include one or more sensor arrays 810 coupled to (e.g., embedded in) the insert 702 to measure one or more properties of the fluid flowing through the channel 704. The insert 702 can include electronic circuits and/or other sensors as discussed in connection with FIGS. 4-6 (e.g., sensors coupled to the flange 802).

Figure 9:
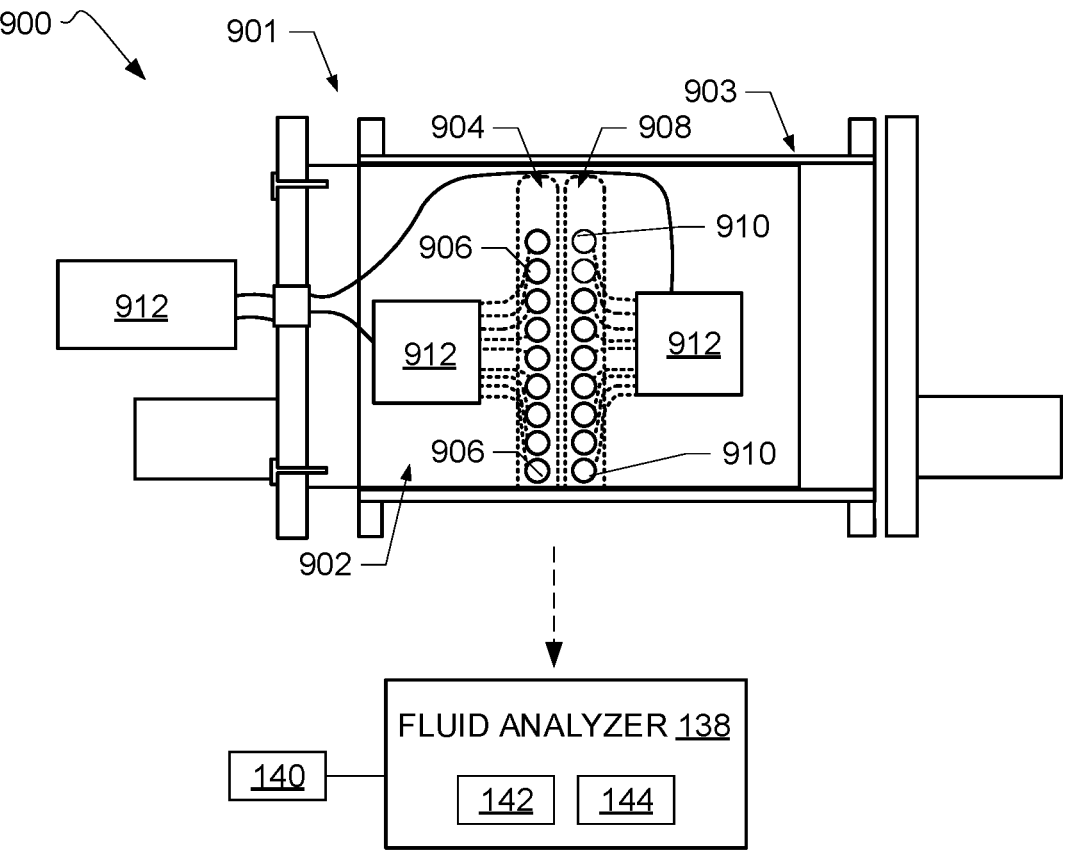
FIG. 9 illustrates an example system including another example flow meter constructed in accordance with teachings disclosed herein.

FIG. 9 illustrates another example system 900 including a substantially horizontally oriented flow meter 901 including an insert 902 disposed in a fluid conduit 903 of the flow meter 901. In some other examples, the fluid conduit 903 is disposed in a substantially downhill or downwardly inclined orientation. The insert 902 of FIG. 9 defines a flow channel for a multiphase fluid flowing through the flow meter 901, substantially as disclosed above in connection with the flow meter 401 of FIG. 4 (e.g., the flow channel 428 of FIG. 4). The insert 902 can be formed separate from the fluid conduit

903 and coupled thereto (e.g., mechanically coupled thereto) or formed integrally with a portion of the fluid conduit 903 through forging, casting, molding, extrusion, etc. For illustrative purposes, a side view of the fluid conduit 903 is shown in FIG. 9.

As shown in FIG. 9, the insert 902 (which can be formed from one or more inserts as discussed in connection with FIGS. 4-8), includes a first sensor array 904 including a plurality of sensors 906 and a second sensor array 908 including a plurality of sensors 910. The second sensor array 908 can be coupled to the insert 902 at a known distance from the first sensor array 904. The sensors 906, 910 of the respective first and second sensor arrays 904, 908 can be the same type of sensor (e.g., an electrical impedance sensor array) or include different types of sensors between the sensor arrays 904, 908. As shown in FIG. 9, the sensor arrays 904, 908 can be communicatively coupled to one or more electronic circuits 912 for transmission of the sensor data to the fluid analyzer 138.

In the example of FIG. 9, the sensors 906, 910 of the respective sensor arrays 904, 908 measure fluid properties such as water holdup along the vertical direction of the horizontally disposed fluid conduit 903 at a liquid flow layer and a gas flow layer of the multiphase fluid. In examples in which the first and second sensor arrays 904, 908 include identical sensors 906, 910, the calculator 142 of the fluid analyzer 138 can determine a velocity distribution profile along a height of the liquid flow layer by determining transit times from cross-correlating the signal data generated by the sensor arrays 904, 908. The calculator 142 determines, for example, an average water holdup, liquid holdup, WLR, water flow rate, and oil flow rate based on the analysis of the data generated by each of the sensor arrays 904, 908.

Figure 10:
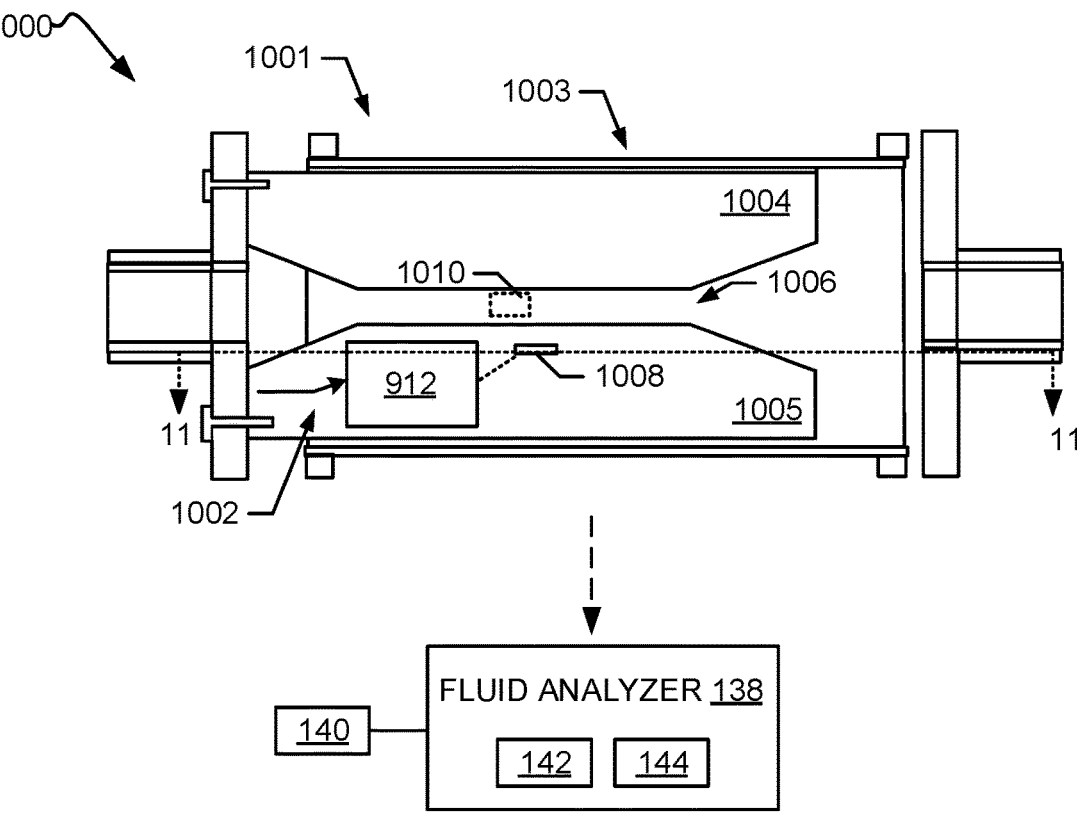
FIG. 10 illustrates an example system including another example flow meter constructed in accordance with teachings disclosed herein.

FIG. 10 illustrates another example system 1000 including a flow meter 1001 including an insert 1002 disposed in a fluid conduit 1003 of the flow meter 1001. The insert 1002 of FIG. 10 defines a flow channel 1006 for a multiphase fluid flowing through the flow meter 1001, substantially as disclosed above in connection with the flow meters 401, 901 of FIGS. 4 and 9. The insert 1002 can be formed separate from the fluid conduit 1003 and coupled thereto (e.g., mechanically coupled thereto) or formed integrally with a portion of the fluid conduit 1003 through forging, casting, molding, extrusion, etc. For illustrative purposes, a top view of the fluid conduit 1003 is shown in FIG. 10. Also, for illustrative purposes, the insert 1002 is shown in FIG. 10 as formed from first and second inserts 1004, 1005, substantially as disclosed above in connection with the first and second insert portions 420, 422 of the insert 402 of FIG. 4.

Figure 11:
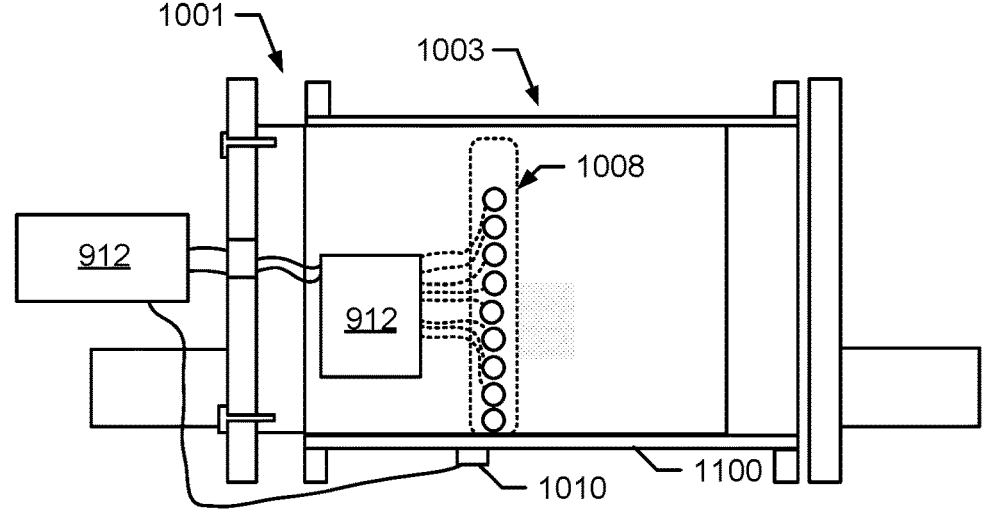
FIG. 11 is a cross-sectional view of the example flow meter of FIG. 10 taken along the 11-11 line of FIG. 10.

As shown in FIG. 10, the second insert 1005 includes a sensor array 1008 to measure one or more properties of a fluid flowing through the fluid conduit 1003, such as water holdup profile along a vertical height of the flow channel 1006. As also shown in FIG. 10, an ultrasonic Doppler flow velocity (UDV) profiling sensor 1010 is coupled to the fluid conduit 1003 (e.g., a surface of the fluid conduit as shown in FIG. 11, below). The UDV sensor 1010 projects an ultrasonic beam through a wall of the fluid conduit 1003 and across a liquid flow layer of the fluid in the channel 1006 to measure a liquid velocity profile and to identify a gas/liquid interface (hence, a liquid holdup). Based on the data generated by the sensor array 1008 and the UDV sensor 1010, the calculator 142 of the fluid analyzer 138 can determine a total liquid flow rate measurement and WLR values for the fluid (where the WLR value is determined from the water holdup profile). The calculator 142 can also determine other values such as oil flow rate and water flow rate.

FIG. 11 is a cross-sectional view of the example flow meter 1001 of FIG. 10 taken along the 11-11 line of FIG. 10. As show in FIG. 11, the UDV sensor 1010 is coupled to (e.g., clamped to) an underside surface 1100 of the fluid conduit 1003. The UDV sensor 1010 can be coupled to the surface 1100 of the fluid conduit 1003 in alignment with channel 1006, as shown in FIG. 10.

In examples where the liquid phase is substantially well mixed (e.g., emulsions), the flow meter 1001 can include the sensor array 1008 (e.g., an electrical impedance sensor array) to provide a measure of WLR determined from the water holdup profile but not include the UDV sensor 1010 to provide for velocity measurements. In such examples, the flow meter 1001 of FIGS. 10 and 11 is used as a WLR meter. Thus, the number and types of sensors coupled to the fluid conduit 1003 can be customized based on the types of measurements to be generated.

Figure 12:
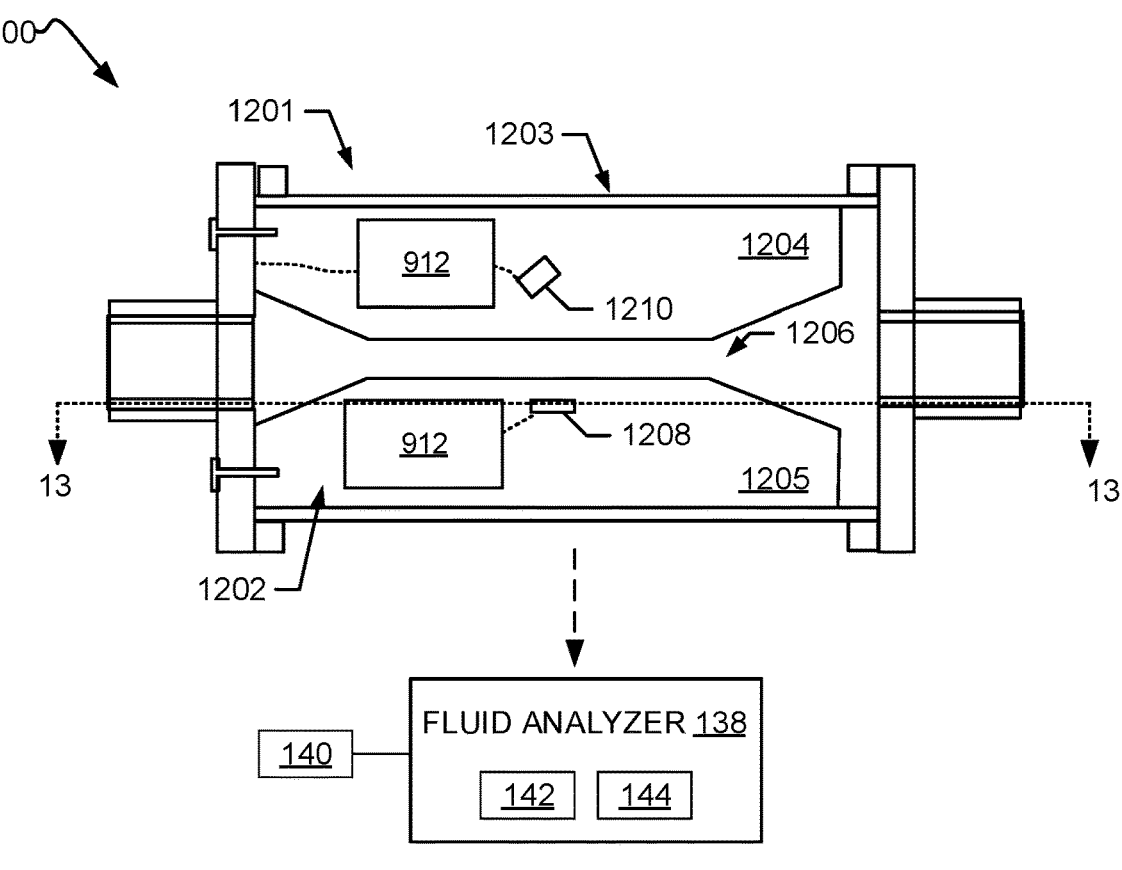
FIG. 12 illustrates an example system including another example flow meter constructed in accordance with teachings disclosed herein.
Figure 13:
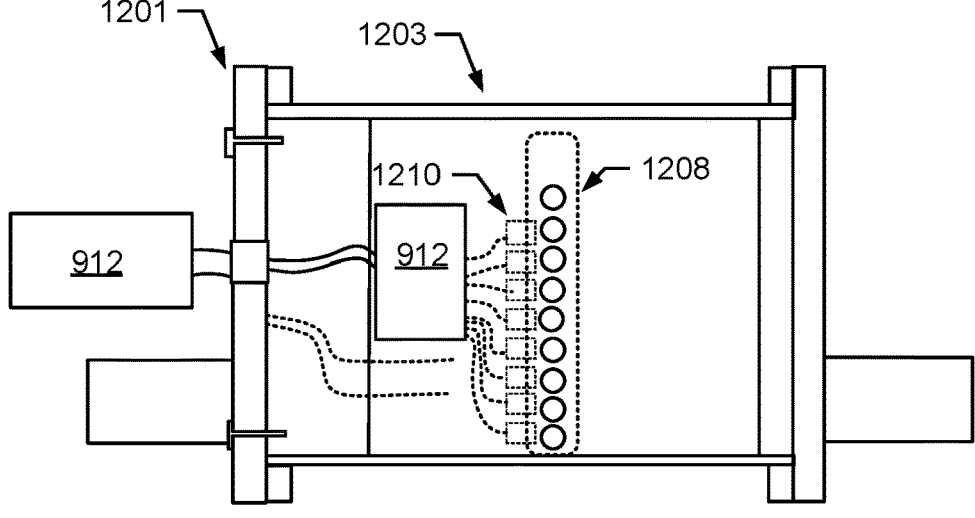
FIG. 13 is a cross-sectional view of the example flow meter of FIG. 12 taken along the 13-13 line of FIG. 12.

FIGS. 12 and 13 illustrate another example system 1200 including a flow meter 1201 including an insert 1202 disposed in a fluid conduit 1203 of the flow meter 1201. The insert 1202 defines a flow channel 1206 for a multiphase fluid flowing through the flow meter 1201, substantially as disclosed above in connection with the flow meters 401, 901, 1001 of FIGS. 4, 9, and 10. The insert 1202 can be formed separate from the fluid conduit 1203 and coupled thereto (e.g., mechanically coupled thereto) or formed integrally with a portion of the fluid conduit 1203 through forging, casting, molding, extrusion, etc. For illustrative purposes, a top view of the fluid conduit 1203 is shown in FIG. 12. A cross-sectional view of the example flow meter 1201 of FIG. 12 taken along the 13-13 line of FIG. 12 is shown in FIG. 13. Also, for illustrative purposes, the insert 1202 is shown in FIG. 12 as formed from first and second inserts 1204, 1205, substantially as disclosed above in connection with the first and second insert portions 420, 422 of the insert 402 of FIG. 4.

As shown in FIGS. 12 and 13, the second insert 1205 includes an electrical impedance sensor array 1208 to measure one or more properties of the fluid flowing through the channel 1206, such as a water holdup profile. As also shown in FIG. 12, the first insert 1204 includes an ultrasonic Doppler transducer array 1210 (e.g., coupled thereto, embedded therein). The ultrasonic Doppler transducer array 1210 can be used to obtain a distributed velocity measurement along a height of a liquid flow layer of a fluid flowing through the fluid conduit 1203. Based on the data generated by the sensor array 1208 and the ultrasonic Doppler transducer array 1210, the calculator 142 of the fluid analyzer 138 can determine WLR values, total liquid flow rate measurements, and water and oil flow rates. The electrical impedance sensor array 1208 and/or the ultrasonic Doppler transducer array 1210 can be coupled to the first insert 1204 and/or the second insert 1205 as shown in FIGS. 12 and 13, or in a different manner (e.g., both sensor arrays 1208, 1210 can be coupled to one of the inserts 1204, 1205).

Figure 14:
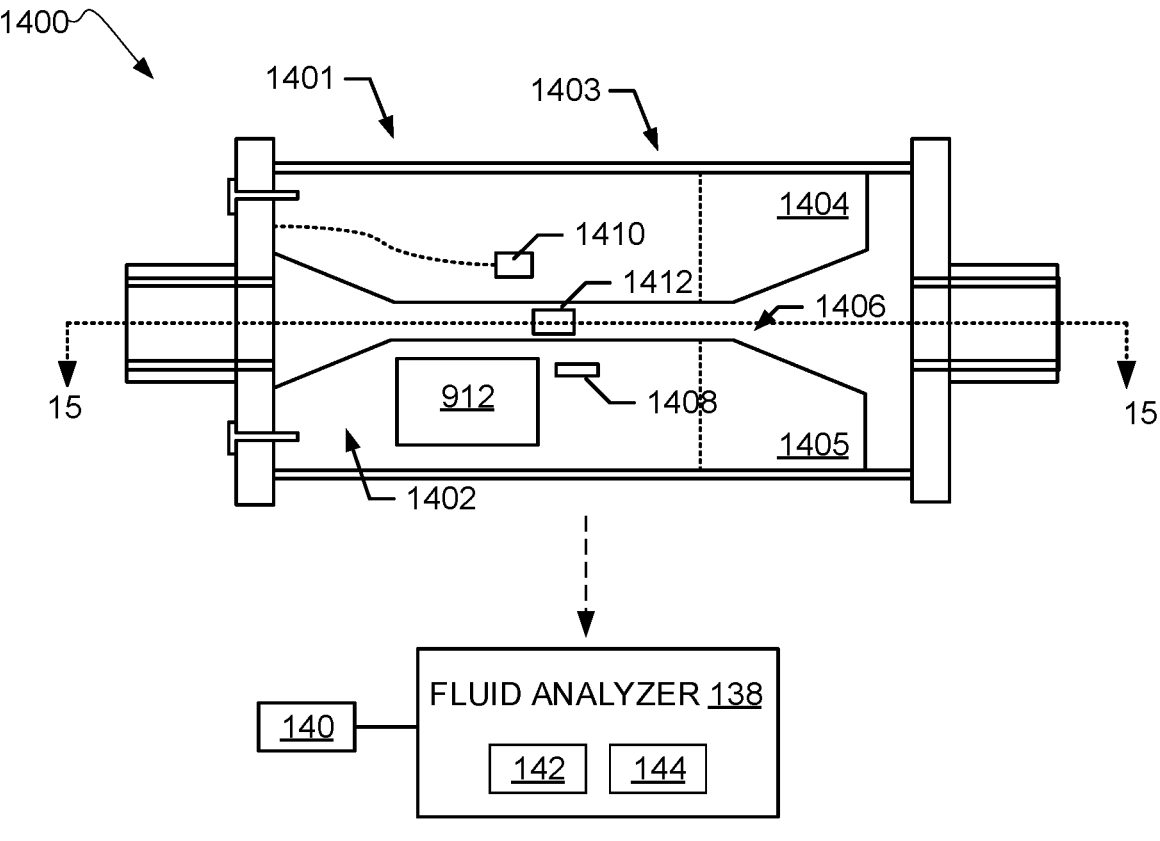
FIG. 14 illustrates an example system including another example flow meter constructed in accordance with teachings disclosed herein.
Figure 15:
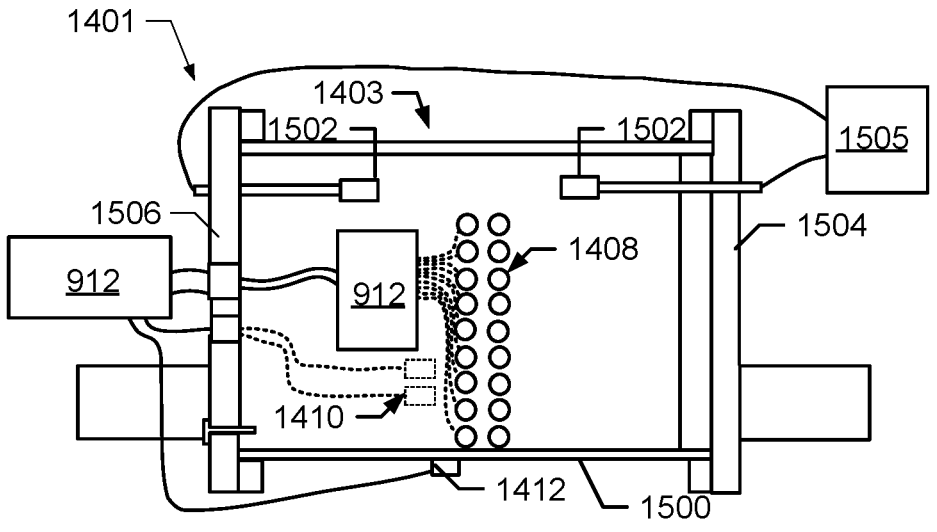
FIG. 15 is a cross-sectional view of the example flow meter of FIG. 14 taken along the 15-15 line of FIG. 14.

FIG. 14 illustrates another example system 1400 including a flow meter 1401 including an insert 1402 disposed in a fluid conduit 1403 of the flow meter 1401. The insert 1402 of FIG. 14 defines a flow channel 1406 for a multiphase fluid flowing through the flow meter 1401, substantially as disclosed above in connection with the flow meters 401, 901, 1001, 1201 of FIGS. 4, 9, 10, and 12. The insert 1402 can be formed separate from the fluid conduit 1403 and coupled thereto (e.g., mechanically coupled thereto) or formed integrally with a portion of the fluid conduit 1403 through forging, casting, molding, extrusion, etc. For illustrative purposes, a top view of the fluid conduit 1403 is shown in FIG. 14. FIG. 15 is a cross-sectional view of the example flow meter 1401 taken along the 15-15 line of FIG. 14. Also, for illustrative purposes, the insert 1402 is shown in FIG. 14 as formed from first and second inserts 1404, 1405, substantially as disclosed above in connection with the first and second insert portions 420, 422 of the insert 402 of FIG. 4.

The example flow meter 1401 of FIGS. 14 and 15 is a three-phase (gas, oil, water) flow meter including one or more sensor arrays 1408 to measure a water holdup profile along a height of a liquid flow layer of the fluid. The sensor array(s) 1408 for measuring the water holdup profile can include an electrical impedance sensor array or an infrared sensor array. The example flow meter 1401 includes one or more ultrasonic Doppler sensor arrays 1410 coupled to the insert 1402 and/or one or more ultrasonic Doppler sensors 1412 coupled to a surface 1500 (e.g., an underside surface) of the fluid conduit 1403, as shown in FIG. 15. As shown in FIG. 15, the example flow meter 1401 includes one or more ultrasonic gas transducers (UGT(s)) 1502 coupled to flange(s) 1504, 1506 to which the fluid conduit 1403 is coupled. The UGT(s) 1502 are communicatively coupled to a gas meter 1505.

In the example of FIGS. 14 and 15, the calculator 142 of the fluid analyzer 138 determines a water holdup profile along a height of a liquid flow layer of the fluid based on data generated by the sensor array(s) 1408 (e.g., the electrical impedance sensor array or the infrared sensor array). The calculator 142 can determine a velocity profile of the liquid phase by determining liquid phase transit times at different heights using cross-correlation of the signals generated by two or more electrical impedance sensor array(s) 1408 or two or more infrared sensor array(s) 1408, the data generated by the ultrasonic Doppler sensor arrays 1410, and/or the data generated by the ultrasonic Doppler sensor(s) 1412 coupled to the fluid conduit 1403. The calculator 142 can determine the liquid holdup of the liquid phase of the fluid based on the (Doppler energy profile) data generated by the ultrasonic Doppler sensor arrays 1410 and/or 1412, a liquid flow rate determined from the velocity profile of the liquid phase, the WLR value determined from the water holdup profile, and oil and water flow rates. Based on the gas holdup determined from the liquid holdup, the calculator 142 can determine gas flow rate using gas velocity measurements collected from a gas flow layer of the fluid by the UGT(s) 1502.

Figure 16:
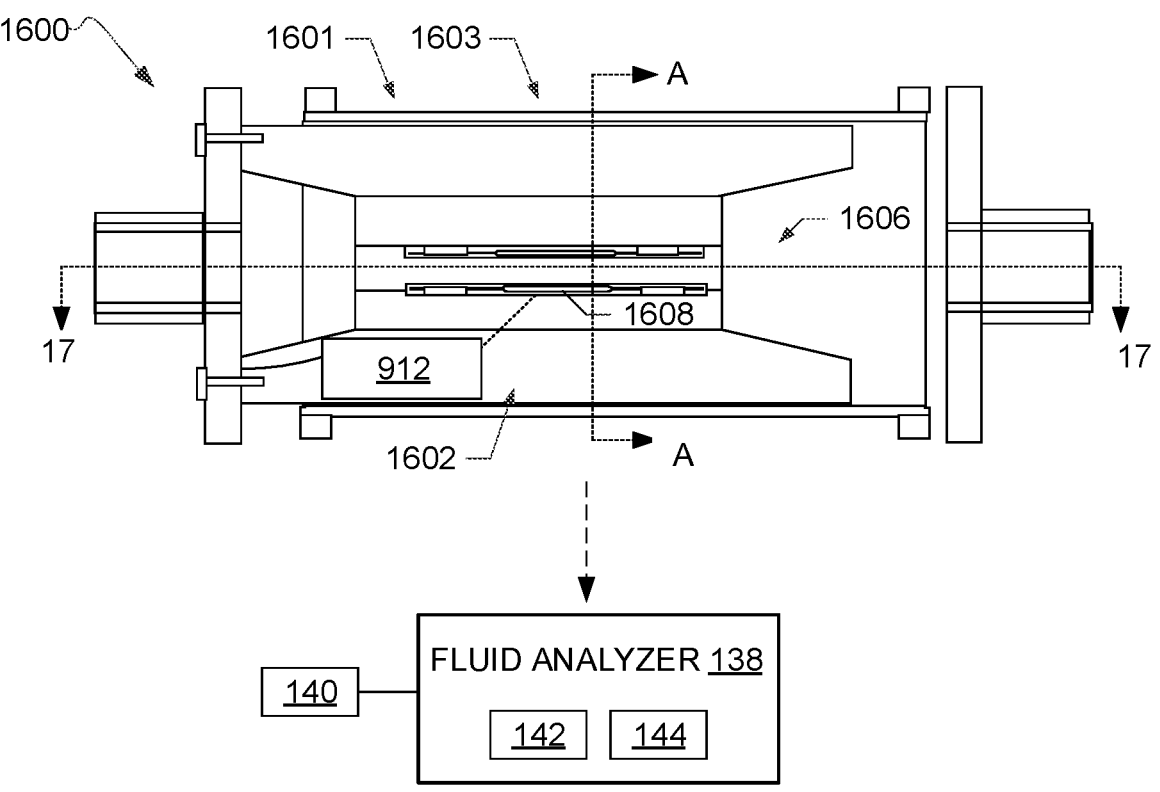
FIG. 16 illustrates an example system including another example flow meter constructed in accordance with teachings disclosed herein.
Figure 17:
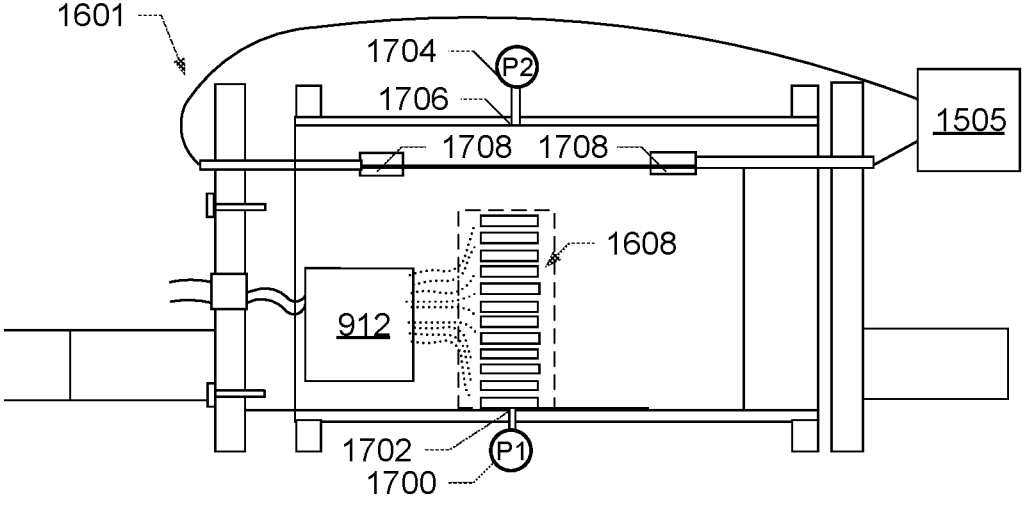
FIG. 17 is a cross-sectional view of the example flow meter of FIG. 16 taken along the 17-17 line of FIG. 16.

FIG. 16 illustrates another example system 1600 including a flow meter 1601 including an insert 1602 disposed in a fluid conduit 1603 of the flow meter 1601. The insert 1602 of FIG. 16 defines a flow channel 1606 for a multiphase fluid flowing through the flow meter 1601, substantially as disclosed above in connection with the flow meters 401, 901, 1001, 1201, 1401 of FIGS. 4, 9, 10, 12, and 14. The insert 1602 can be formed separate from the fluid conduit 1603 and coupled thereto (e.g., mechanically coupled thereto) or formed integrally with a portion of the fluid conduit 1603 through forging, casting, molding, extrusion, etc. For illustrative purposes, a top view of the fluid conduit 1603 is shown in FIG. 16. FIG. 17 is a cross-sectional view of the example flow meter 1601 taken along the 17-17 line of FIG. 16. Also, for illustrative purposes, the insert 1602 is shown in FIG. 16 as formed from an integrated or singe insert, substantially as disclosed above in connection with the insert 702 of FIG. 7.

The example flow meter 1601 of FIGS. 16 and 17 is a three-phase (gas, oil, water) flow meter including one or more sensor arrays 1608 to measure a water holdup profile along a height of a liquid flow layer of the fluid. The sensor array(s) 1608 for measuring the water holdup profile can include an electrical impedance sensor array or an infrared sensor array. The example flow meter 1601 of FIGS. 16 and 17 also include a first pressure sensor 1700 to measure pressure at a first pressure measuring point 1702 (labeled P1 in FIG. 17) and a second pressure sensor 1704 to measure pressure at a second measuring point 1706 (labeled P2 in FIG. 17). As illustrated in FIG. 17, the first pressure measuring point 1702 is located at a floor level of the channel 1601, and the second pressure measuring point 1706 is located at a ceiling level of the channel 1601. The calculator 142 of the example fluid analyzer 138 can determine a differential pressure measurement between the two points 1702, 1706 using the following equation:

$$\Delta P = P1 \text{-} P2. \tag{10}$$

In some examples, the differential pressure can be measured between the two points 1702, 1706 using a single differential pressure sensor coupled to the first and second pressure measuring points 1702, 1706. The calculator 142 can use the differential pressure measurement with water cut and liquid density data to derive a height h of the gas/liquid interface using the following equation:

$$h = (P1 \text{-} P2)(\rho_L \text{*} g), \tag{11}$$

where g is gravitational acceleration and $\rho_L$ is the density of the liquid phase. The density $\rho_L$ can be obtained from the water cut determined from the sensor array 1608. For a downhill stratified flow, the height, h, can be used to derive the liquid flow rate by using one or more flow models, such as the Manning model, from hydraulic engineering analysis. As shown in FIG. 17, the example flow meter 1601 can include other sensors such as an ultrasonic gas transducers 1708.

Figure 18:
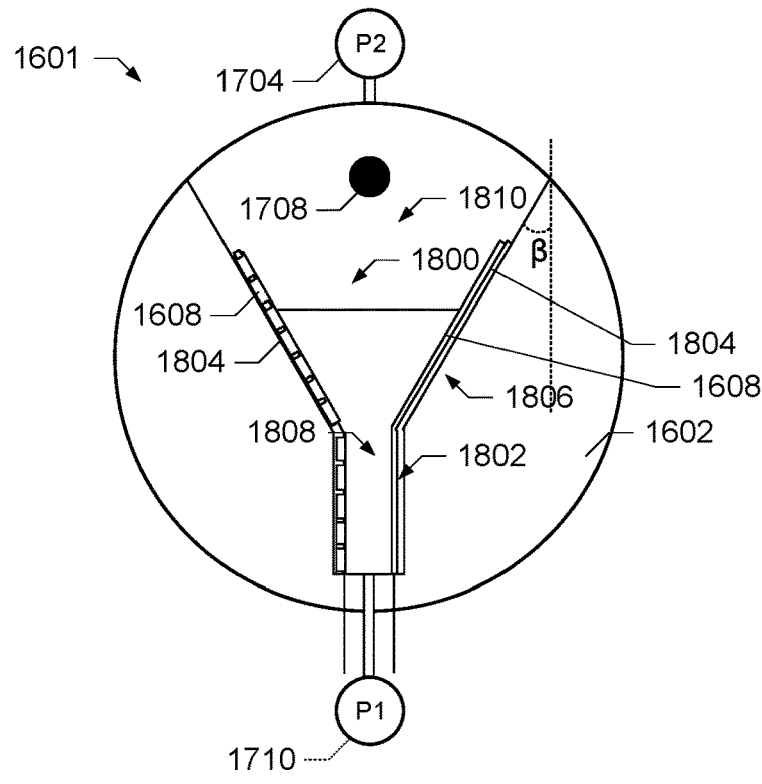
FIG. 18 is a front view of an example fluid conduit that may be used with the example flow meter of FIG. 16.

FIG. 18 is a cross-sectional view of the example flow meter 1601 of FIG. 16 taken along the A-A line of FIG. 16 having a first example channel 1800 (e.g., the channel 1606 of FIG. 16). As show in FIG. 18, a cross section of the channel 1800 is substantially Y-shaped. A first portion 1802 of the channel 1800 is rectangular or substantially rectangular in shape (e.g., having very small deviation angle relative to walls 1804 of the channel 1800). A second portion 1806 of the channel 1800 has a trapezoid shape with a deviation angle, β, from the wall 1804 of the insert 1602 that defines the channel 1800. In the example of FIG. 18, the sensor array 1608 is mounted along the walls 1804 of the insert 1602 and follows the deviation angle of the first and/or second portions 1802, 1806 of the channel 1800. The Y-shaped cross-section of the channel 1800 of FIG. 18 facilitates stratification of a liquid layer 1808 and a gas layer 1810. In the example of FIG. 18, the sensor array 1608 can extend along the walls 1804 between the first and second portions 1802, 1806 of the channel 1800 to capture data along a height of the liquid layer 1808.

Figure 19:
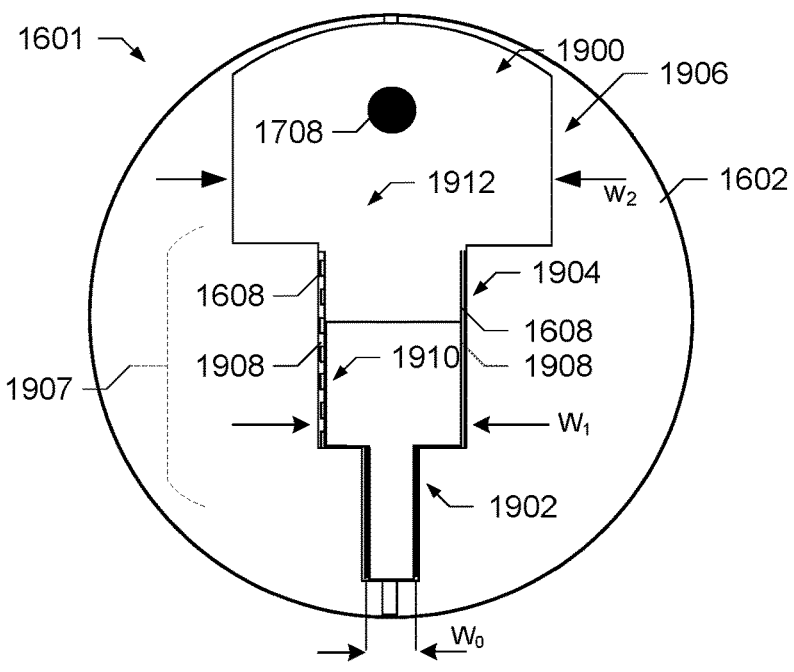
FIG. 19 is a front view of another example fluid conduit that may be used with the example flow meter of FIG. 16.

FIG. 19 is a cross-sectional view of the example flow meter 1601 of FIG. 16 taken along the A-A line of FIG. 16 having a second example channel 1900 (e.g., the channel 1606 of FIG. 16). As show in FIG. 19, the channel 1900 of FIG. 19 has a T-shaped cross section. A first portion 1902 of the example channel 1900 of FIG. 19 has a first width $w_0$, a second portion 1904 of the channel 1900 has a second width $w_1$ greater than the first width $w_0$, and a third portion 1906 of the channel 1900 has a third width $w_3$ greater than the first width $w_0$ and the second width $w_1$. The sensor array 1608 is coupled to walls 1908 of the insert 1602, following a step-like indentation 1907 of the channel portions 1902, 1904, 1906 as shown in FIG. 19. The T-shaped cross-section of the channel 1900 of FIG. 19 facilitates stratification of a liquid layer 1910 and a gas layer 1912. In the example of FIG. 18, the sensor array 1608 can extend along the walls 1908 between the first, second, and third portions 1902, 1904, 1906 of the channel 1900 to capture data along a height of a liquid layer 1910.

Thus, the examples of FIGS. 4-19 show different modular insert system for monitoring fluid flow that can be customized to condition a multiphase fluid flow and to obtain different flow properties and measurements. The number and types of sensor(s) as well as the locations of the sensor(s) relative to the fluid conduit can be varied to generate flow property data for the fluid along a flow channel defined by an insert in the fluid conduit. The increased thickness of the fluid phase layers due to the conditioning of the flow via the channel improves the measurements of flow parameters such a flow velocity, holdup, flow rates, WLR, etc. along a height of the channel as compared to when the phase layers are thin (e.g., in examples in which the fluid conduit does not include the insert). Fluid property data (e.g., WLR; flow rates for the gas, liquid and oil phases; liquid velocity profiles, water holdup profiles) can be generated for one or more phases of the fluid. The various example modular systems discussed herein can include, for instance, a WLR meter with one or more electrical impedance array(s); a liquid flow meter including an ultrasonic Doppler array unit; a water and oil flow meter with electrical impedance sensor arrays and ultrasonic Doppler sensor(s) and/or sensor array(s); a liquid and gas two-phase flow meter with an ultrasonic gas transducer disposed proximate to a gas flow region and ultrasonic Doppler sensor(s), and a full three-phase flowmeter combining all the various foregoing examples.

Figure 20:
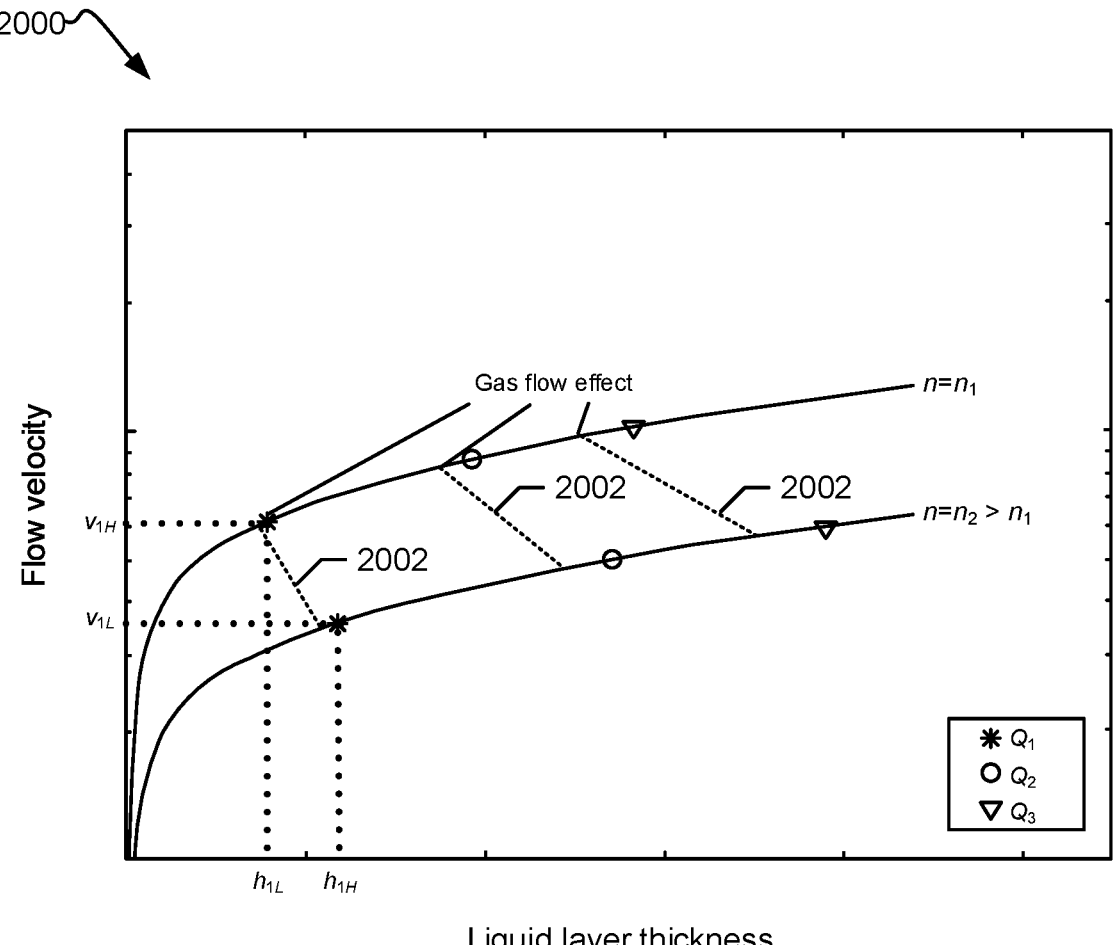
FIG. 20 depicts an example model that may be used to derive flow parameters and optimize a design of a channel of the example flow meters disclosed herein.

FIG. 20 illustrates an example model 2000 that can be used to optimize a design of a channel (e.g., the channel(s) 428, 704, 1006, 1206, 1406, 1606, 1800, 1900 of FIGS. 4-19) of a flow meter (e.g., the flow meter(s) 401, 901, 1001, 1201, 1401, 1601 of FIGS. 4-19) to condition a fluid flow to have a particular liquid layer thickness for given fluid properties (e.g., density, viscosity, etc.) as well as flow rate and gas-volume-fraction ranges. Design parameters for the channel can include a diameter and length of a fluid conduit of the flow meter (e.g. the fluid conduit(s) 403, 700, 903, 1003, 1203, 1403, 1603 of FIGS. 4-19), a width and a height of the channel, a sidewall deviation angle β (e.g., of the sidewalls 425 of the insert 402 of FIG. 4), a minimum width $W_0$ of the channel in examples in which the cross-section of the channel has a trapezoidal shape or V-shaped, and a downhill angle θ of a portion of the insert (e.g., the second portion 806 of the insert 702 FIGS. 7 and 8).

In the example of FIG. 20, the model 2000 can be used by the fluid analyzer 138 to calculate liquid (e.g., water) layer thickness and velocity of a liquid phase in a channel such as the channel(s) 428, 704, 1006, 1206, 1406, 1606, 1800, 1900 of FIGS. 4-19 based on Manning's equation. The model 2000 of FIG. 20 uses Manning's equation to estimate the thickness and velocity of a liquid flow layer for a liquid flow range from a low value $Q_1$ to a high value $Q_3$. In the example of FIG. 20, the channel may have a trapezoidal-shaped cross-section with a base width of $W_0$, a channel wall angle of β, and a channel downhill angle of θ. Based on these design parameters and a viscous friction of the liquid (as characterized by a value of the Manning coefficient n, where $n=n_1$ for water and $n=n_2 \cong 2^*n_1$ for liquid crude oil) at a low liquid rate $Q_1$, the liquid layer thickness can vary between a low range from $h_{1L}$ to $h_{1H}$ and the liquid velocity between a low range from $v_{1L}$ to $V_{1H}$, depending on the viscosity of the liquid. Using the same design parameters $W_0$, β and θ, at a high liquid rate $Q_3$, the thickness can vary between a high range from $h_{3L}$ to $h_{3H}$ and the liquid velocity can vary in a high range between $v_{3L}$ and $v_{3H}$. As the friction factor increases from $n_1$ to $n_2$, the liquid layer thickness increases and the velocity decreases. The Manning equation assumes that gas is not flowing (e.g., zero gas velocity). Accordingly, the dashed lines 2002 in the example of FIG. 20 represent the influence of gas flow (e.g., drag) on the liquid layer, which may cause the liquid layer to be thinner and faster flowing.

Figure 21:
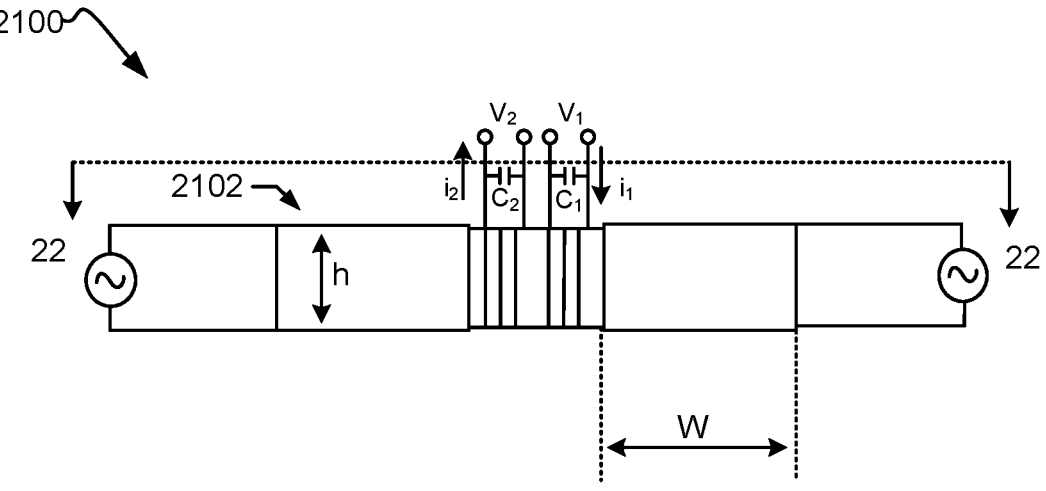
FIG. 21 is a top view of an example sensor that may be implemented with the example flow meter(s) of FIGS. 4-19.
Figure 22:
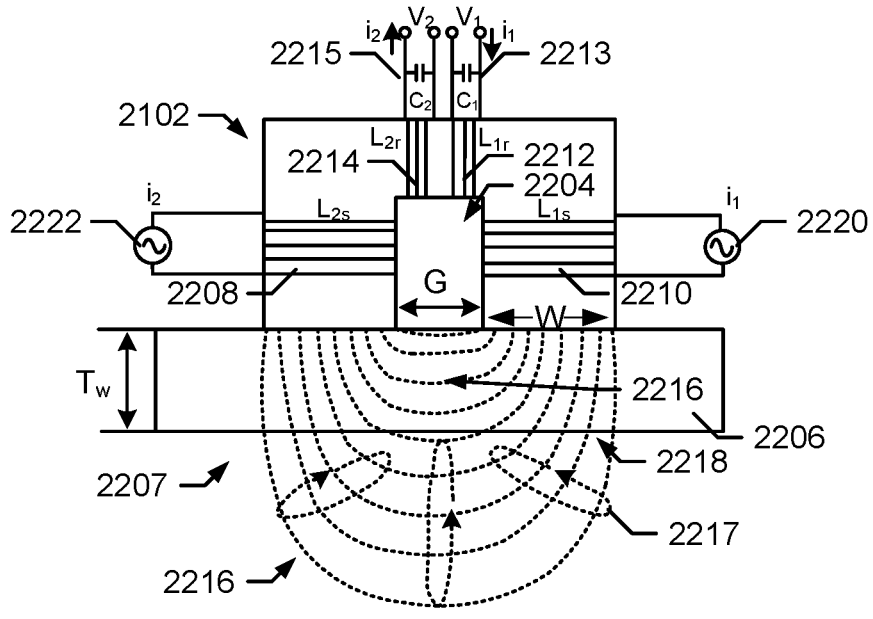
FIG. 22 is a cross-sectional view of the example sensor of FIG. 21 taken along the 22-22 line of FIG. 21.

As disclosed above in connection with FIGS. 4-19, example flow meters can include inserts having sensor(s) and/or sensor array(s) disposed therein to measure fluid properties. FIG. 21 is a top view of an example sensor 2100 that may be implemented with the example flow meter(s) 401, 901, 1001, 1201, 1401, 1601 of FIGS. 4-19 to measure water holdup, or a volumetric or cross-sectional fraction of a multiphase fluid occupied by water. FIG. 22 is a cross-sectional view of the example sensor 2100 taken along the 22-22 line of FIG. 21. As disclosed herein, the water holdup values can be used to determine water cut, or an amount of water produced as a fraction of a total liquid flow rate in a multiphase fluid (e.g., gas, oil, water) produced from an oil well.

Referring to FIG. 21, the example sensor 2100 includes a core 2102 having a thickness h and a width W. The core 2102 can include a material having a relative magnetic permeability greater than unity (e.g., μ>>1) such as nickel zinc (NiZn) ferrite or iron powder (e.g., a ferromagnetic core). Referring to FIG. 22, the example core 2102 is U-shaped. The core 2102 can have other shapes, such as a semi-circle shape. In the example of FIG. 22, the core 2102 defines a gap 2204 having a width G. Also, as shown in FIG. 22, the core 2102 of the example sensor 2100 is disposed proximate to an insulator 2206. In operation, a fluid 2207 flows past the insulator 2206. Thus, the example sensor 2100 is a non-contact sensor with respect to the fluid and the core 2102. The insulator 2206 can include a hydrophobic material to reduce sensor measurement errors due to water wetting films that may otherwise form on the insulator 2206.

The example sensor 2100 includes a first excitation coil 2208 and a second excitation coil 2210 wound around respective portions of the core 2102. The example sensor includes a first detection coil 2212 and a second detection coil 2214. The first detection coil 2212 forms a first resonant or LC (inductor-capacitor) circuit with a first capacitor 2213. The second detection coil 2214 forms a second resonant or LC circuit with a second capacitor 2215. The example sensor 2100 can include additional or fewer excitation coils and/or detection coils than the example shown in FIG. 22.

In the example of FIG. 22, one or more electrical currents applied to the respective excitation coil(s) 2208, 2210 generate a magnetic flux in the core 2102. For example, a first electrical current I2 can be applied to the first excitation coil 2208 and a second electrical current I1 can be applied to the second excitation coil 2210. In some examples, the electrical currents I1, I2 can have different frequencies to obtain different measurements with respect to oil and water in the fluid 2207. The application of the current(s) to the excitation coil(s) 2208, 2210 generates a time-varying magnetic field 2216 in the gap 2204. The magnetic field interacts with the fluid 2207 via the insulator 2206 and induces eddy and/or displacement currents 2217 in the fluid 2207. Depending on the permittivity, the conductivity, and/or the magnetic permeability of the fluid 2207, the eddy and/or displacement currents 2217 are generated in the fluid 2207 according to Faraday's law of induction:

$$J + \frac{dD}{dt} = \mu \nabla \times B, \qquad (10)$$

where J is the induced eddy current, D is the electrical displacement field, $\mu$ is the magnetic permeability, $$\frac{dD}{dt}$$

is the displacement current, and B is magnetic flux. Using a magnetic vector potential A as a main field variable, $$B = \nabla \times A, \qquad (11)$$

and using Maxwell equations, the induction field problem for a sinusoidal excitation source can be expressed as:

$$\nabla^2 A = j\omega\mu A(\sigma + j\omega\varepsilon) - \mu J_s, \qquad (12)$$

where $\omega = 2\pi f$ is the angular frequency of excitation; $\sigma$ and $\varepsilon$ are the electrical conductivity and permittivity of the fluid, respectively; and $J_s$ is a source current density. In FIG. 22, the source current density $J_s$ can be determined by the driving current I1 and/or I2, a cross section of the wire of the coils 2208, 2210, and a number of turns of the coil(s) 2208, 2210. Given the geometry, excitation amplitude, and boundary conditions, the differential Equation 12 can be solved to provide a correlation between the parameters of interest, $\sigma$ and $\varepsilon$, and the variables A, B, which can be measured.

Based on Lenz's law, the induced currents in the fluid 2207 produce secondary magnetic fields. The secondary magnetic fields produced by the eddy currents and/or the displacement currents in the fluid 2207 cause changes in the net magnetic flux in the core 2102 of the sensor 2100. These changes translate to changes in electrical impedance of the excitation coils 2208, 2210 and the detection coils 2212, 2214, which can be measured via the respective resonant circuits formed between the first detection coil 2212 and the first capacitor 2213 and between the second detection coil 2214 and the second capacitor 2215. For instance, in the case of an eddy current, the secondary magnetic fields cause a reduction in the original inductance of the excitation coil(s) 2208, 2210 and an increase in coil resistance. Accordingly, by measuring the impedance Les of, for example, the first excitation coil 2208 or the impedance $L_{1r}$ of the first detection coil 2212 (e.g., via a voltage V and a current i of the first detection coil 2212 or via shift in the resonance of the frequency of the LC circuit including the first detection coil 2212), the conductivity and permittivity properties $\sigma$ and $\varepsilon$ of the fluid 2207 can be determined using the example fluid analyzer 138 of, for instance, FIG. 4. Water holdup values can be derived by the calculator 142 of the fluid analyzer 138 from the values of $\sigma$ and $£$ using, for example, a mixing model.

As mentioned above, the sensor 2100 can implement different frequency ranges to measure properties of a multiphase fluid include oil and water. For example, a low frequency range (e.g., 10 kHz to 4 MHz) can be used for water-continuous flow measurements and a higher frequency range (e.g., 5 MHz to 100 MHz) can be used to measure oil-continuous flows. The ability of the example sensor 2100 to measure properties of the fluid 2207 (e.g., water holdup) overcomes disadvantages associated with using a single frequency to address variables or properties of a water-continuous flow (e.g., salinity) and an oil-continuous flow.

In some examples, the first excitation coil 2208 is coupled to a first current source 2222 and the second excitation coil 2210 is coupled to a second current source 2220. In such examples, each the first and second current sources 2220, 2222 drives the respective first and second excitation coils 2208, 2210.

In some other examples, one of the first or second excitation coils 2208, 2210 is driven via the first current source 2222 and the second current source 2220. The current sources 2220, 2222 provide current having different frequencies (e.g., for water flows and oil flows). In some such examples, the first excitation coil 2208 or the second excitation coil 2210 is driven via the current sources 2220, 2222 simultaneously or substantially simultaneously (e.g., within milliseconds of one another). In other such examples, the first excitation coil 2208 or the second excitation coil 2210 is driven via the current sources 2220, 2222 sequentially, or via one source at a given time.

As mentioned above, in some examples, each of the first and second detection coils 2212, 2214 forms a respective L-C resonance circuit with the respective first and second capacitors 2213, 2215. In some other examples, the first excitation coil 2208 and/or the second excitation coil 2210 serve as the detection coil(s). In such examples, the inductance of the first and/or second excitation coil 2208, 2210 can be determined by measuring real and imaginary parts of the voltage across the coil(s) 2208, 2210.

In the example of FIG. 22, the sensitivity of the example sensor 2100 of FIGS. 21 and 22 with respect to the properties of the fluid 2207 is generally distributed around the gap 2204. The insulator 2206 separates the ends of the core 2102 from the fluid 2207, thereby providing for non-contact measurement of the fluid 2207. By selecting design parameters such as the width G of the gap 2204, a width W of the core 2102, and a thickness $T_w$ of the insulator 2206, the sensitivity distribution of the sensor 2100 relative to the fluid 2207 can be adjusted to provide for a local sensitivity or a sensitivity that is spread over a larger area of the fluid 2207. In particular, the distribution of the magnetic field 2216 in the fluid 2207 can be controlled by the design parameters including the width G of the gap 2204, the width W of the core 2102, and the thickness $T_w$ of the insulator 2206. For example, adjustments to the thickness $T_w$ of the insulator 2206 define a sensing zone 2218 of the sensor 2100, or the sensitivity of the sensor 2100 relative to the fluid. For a sensor sensitivity distribution that is more weighted toward a region proximate to the insulator 2206, an insulator 2206 having a small thickness $T_w$ value may be used. To spread the sensor sensitivity distribution more evenly into the fluid 2207, an insulator 2206 having a greater thickness $T_w$ value may be used. In some examples, smaller values of G, W, h and $T_w$ decrease sensitivity of the sensor 2100, thereby creating a local sensor 2100.

FIG. 23 illustrates a first example sensor 2300 having a relatively shallow sensing zone with respect to a fluid 2302 flowing past the sensor 2300, or a sensor in which sensitivity of the sensor decays more than 50% at a particular distance (e.g., 5 mm) from the sensor wall into the fluid. The first example sensor 2300 is substantially similar to the example sensor 2100 of FIG. 21, including a core 2304 (e.g., a ferrite core) defining a gap 2306 therein. An insulator 2308 separates the core 2304 from the fluid 2302. An electrical wire coil 2310 is wrapped around a portion of the core 2304. In the example of FIG. 23, the core 2304 has a first width W and the insulator 2308 has a first thickness $T_w$. As shown in FIG. 23, applying a current source to the coil 2310 generates a magnetic field 2312 that extends into the fluid 2302 and can generate eddy currents in the fluid 2302, as discussed above.

FIG. 24 illustrates a second example sensor 2400 having a relatively deep sensing zone with respect to a fluid 2402 flowing past the sensor 2400, or a sensor in which sensitivity of the sensor decays less than 50% at a particular distance (e.g., 5 mm) from the sensor wall into the fluid. The second example sensor 2400 is substantially similar to the example sensor 2100 of FIG. 21, including a core 2404 defining a gap 2406 therein. An insulator 2408 separates the core 2404 from the fluid 2402. An electrical wire coil 2410 is wrapped around a portion of the core 2404. In the example of FIG. 24, the core 2404 has a second width W and the insulator 2408 has a second thickness $T_w$. As compared to the first sensor 2300 of FIG. 23, the second width W of the core 2404 of the second sensor 2400 of FIG. 24 is greater than the first width W of the core 2304 of the first sensor 2300 of FIG. 23. Also, as compared to the first sensor 2300 of FIG. 23, the second thickness $T_w$ of the insulator 2408 of the second sensor 2400 of FIG. 24 is less than the first thickness $T_w$ of the first sensor 2300 of FIG. 23. The difference in the design parameters of the second sensor 2400 of FIG. 24 as compared to the first sensor 2300 of FIG. 23 affects the extent to which the magnetic field extends into the fluid 2402 and, thus, the sensitivity of the second sensor 2400 in detecting the fluid. As shown in FIG. 24, applying a current source to the coil 2410 generates a magnetic field 2412 that extends into the fluid 2402. As compared to the magnetic field 2312 associated with the first sensor 2300 of FIG. 23, the magnetic field 2412 associated with the second sensor 2400 of FIG. 24 extends farther into the fluid 2402. Thus, the sensitivity of the sensors 2100, 2300, 2400 of FIGS. 21-24 relative to the fluid can be selectively adjusted to achieve a preferred sensitivity distribution in the fluid.

The example sensor(s) 2100, 2300, 2400 of FIGS. 21-24 can be implemented in a sensor array to measure non-uniform water distributions in a fluid conduit. The sensor array(s) including the sensor(s) 2100, 2300, 2400 of FIGS. 21-24 can be implemented with example flow meter(s) 401, 901, 1401, 1601 of FIGS. 4-19. The data generated by the sensor(s) 2100, 2300, 2400 of the sensor array(s) can be analyzed by the fluid analyzer 138.

FIG. 25 illustrates a first example sensor array 2500 including a plurality of the example sensors 2100 of FIGS. 21-24 disposed in (e.g., embedded in) an insulator 2502. In the example of FIG. 25, the sensors 2100 are disposed at different angular positions in the insulator 2502. As illustrated in FIG. 25, the insulator 2502 is ring-shaped and defines a bore 2504 therein. A diameter of the bore 2504 can be substantially equal to a diameter of a fluid conduit carrying a multiphase fluid 2506 including a water layer 2508, an oil layer 2510, and a gas layer 2512. The insulator 2502 including the example sensor array 2500 of FIG. 25 can be inserted in line with the fluid conduit between, for example, two flanges. As a multiphase fluid 2506 flows through the bore 2504 of the insulator 2502, each of the sensors 2100 measures a water holdup value at the circumferential location of the sensors 2100. In the example of FIG. 25, the water holdup values measured by the sensors 2100 at the different circumferential locations can be combined to determine an overall water holdup value for the fluid 2506, as discussed herein.

FIG. 26 illustrates a second example sensor array 2600 including a plurality of the example sensors 2100 of FIGS. 21-24 disposed in one or more linear arrays 2602. In the example of FIG. 26, the linear array(s) 2602 measure water distribution along a height of a rectangular fluid conduit (e.g., in a vertical direction). The sensor(s) 2100 of the linear array(s) 2602 are disposed in (e.g., embedded in) an insulator 2604 that defines a flow channel 2606 for a multiphase fluid 2608 including a water layer 2610, an oil layer 2612, and a gas layer 2614. In some examples, the sensor array 2600 includes two insulators 2604 that are spaced apart to define the flow channel 2606. In the example of FIG. 26, two of the linear arrays 2602 can be disposed on opposite sides of the flow channel 2606 to increase a spatial resolution of the water holdup measurement determined from data generated by the sensors 2100 of the linear arrays 2602. In some examples, the value of the thickness h of the core 2102 of the sensors 2100 (FIG. 21) can define a spatial resolution of the water distribution measured along the vertical height of the flow channel 2606 of FIG. 26. In some examples, to minimize cross-talk between the linear arrays 2602 disposed on opposite sides of the flow channel 2606, the electromagnetic core of each of the sensors 2100 can be shielded with a magnetic (e.g., ferrite) shield 2616, as shown in FIG. 26.

FIG. 27 illustrates another example sensor array 2700 including a first linear array 2702 having a plurality of sensors 2704 and a second linear array 2706 having a plurality of sensors 2708. The sensors 2704, 2708 of the first and second linear arrays 2702, 2706 are substantially the same as the sensors 2100 of FIGS. 21-26. The sensor(s) 2704, 2708 of the first and second linear arrays 2702, 2706 are disposed in (e.g., embedded in) an insulator 2710 that defines a flow channel 2712 for a multiphase fluid 2714 including a water layer 2716, an oil layer 2718, and a gas layer 2720. In the example of FIG. 27, the linear arrays 2702, 2706 are disposed on opposite sides of the flow channel 2712. The sensors 2704, 2708 of the respective linear arrays 2702, 2706 can be used to measure flux across the flow channel 2712.

FIG. 28 is a cross-sectional view of the example sensor array 2700 of FIG. 27 taken along the 28-28 line of FIG. 27. In particular, FIG. 28 illustrates a first sensor 2704 of the first linear array 2702 and a second sensor 2708 of the second linear array 2706 disposed on opposite sides of the flow channel 2712. The first example sensor 2704 of the first linear array 2702 includes a first excitation coil 2800, a second excitation coil 2802, a first detection coil 2804, and a second detection coil 2806 wound around a core 2808. The core 2808 can include, for example, ferrite. The core 2808 of the first sensor 2704 defines a gap 2809. The first example sensor 2704 includes a magnetic shield 2810.

The second example sensor 2708 of the second linear array 2706 of FIGS. 27 and 28 includes a first detection coil 2812 and a second detection coil 2814 wound around a core 2816. The core 2816 of the second sensor 2708 defines a gap 2817. A current or voltage source is applied to excitation coil(s) 2800, 2802 of the first sensor 2704. In some examples, the first and second detection coils 2804, 2806 of the first example sensor 2704 are used to measure magnetic flux substantially as disclosed above in connection with FIGS. 21 and 22. In other examples, the first sensor 2704 of the first linear array 2702 forms a magnetic circuit loop across the flow channel 2712 with the second sensor 2708 of the second linear array 2706. In such examples, the detection coils 2812, 2814 can be used to measure the flux across the flow channel 2712. Thus, the example sensor array 2700 of FIGS. 27 and 28 provides for different arrangements of sensors across the flow channel 2712 and means for measuring magnetic flux.

Figure 29:
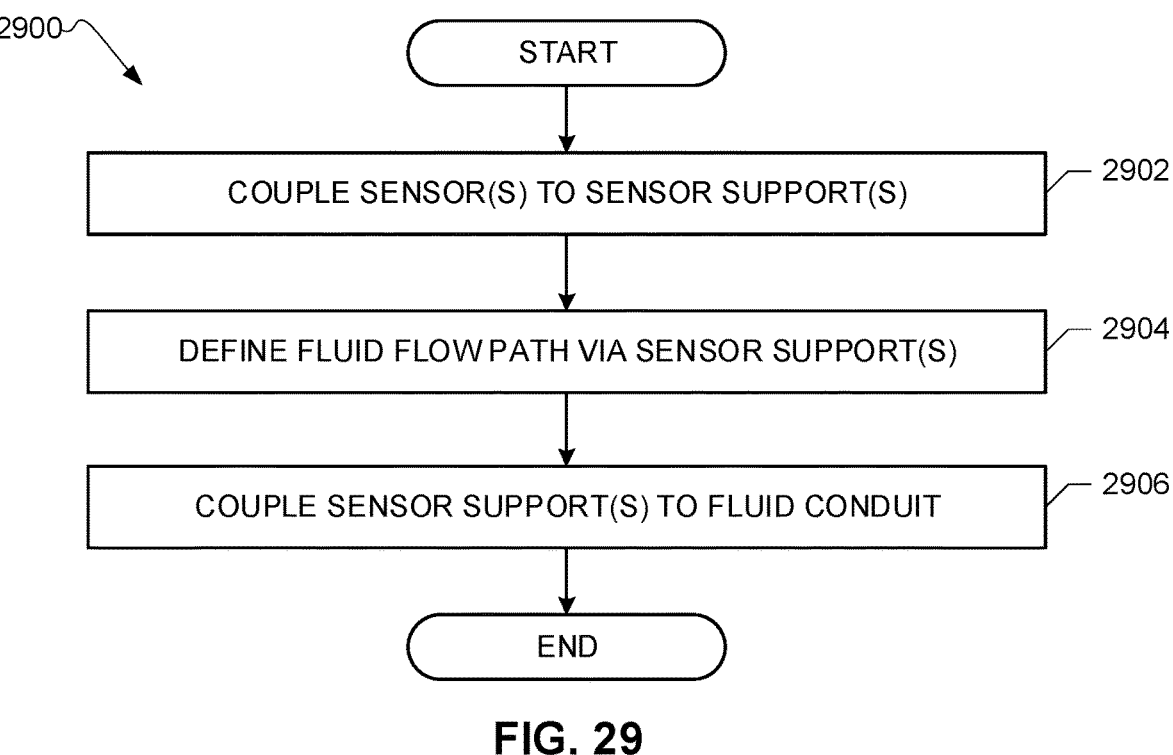
FIG. 29 is a flowchart of an example method for manufacturing a flow meter in accordance with teachings disclosed herein.

FIG. 29 is a flowchart of an example method 2900 to manufacture a flow meter that can be used, for instance, to measure fluid flowing through a horizontally oriented or downwardly inclined fluid conduit. The example method 2900 of FIG. 29 includes coupling one or more sensors to one or more sensor supports (block 2902). For example, the sensor(s) 134, 226, 326 of FIGS. 1-3 are coupled to the plates 120, 122, 124, 126, 128, 212, 214, 226, 218, 220, 312, 314, 316, 318, 320 of FIGS. 1-3. As another example, the sensor(s) and/or sensor array(s) 436, 810, 904, 906, 908, 910, 1008, 1208, 1210, 1408, 1410, 1608, 2100, 2600, 2602, 2700, 2704, 2708 of FIGS. 4-19 and 21-28 are coupled to the insert portion(s) 402, 420, 422, 702, 902, 1002, 1004, 1005, 1202, 1205, 1204, 1402, 1405, 1404, 1602 of FIGS. 4-18.

The example method 2900 of FIG. 29 includes defining a fluid flow path for a multiphase fluid via the sensor support(s) (block 2904). For example, the plates 120, 122, 124, 126, 128, 212, 214, 226, 218, 220, 312, 314, 316, 318, 320 of FIGS. 1-3 can be spaced apart so as to allow fluid to flow between the plates and past the sensor(s) 134, 226, 326 coupled to the plates. As another example, the insert(s) 402, 420, 422, 702, 902, 1002, 1004, 1005, 1202, 1205, 1204, 1402, 1405, 1404, 1602 of FIGS. 4-19 can define a flow channel or bore 428, 704, 1006, 1206, 1406, 1606, 1800, 1900, 2504, 2606, 2712 through which a fluid flows. In some examples, one or more portions of the insert portion(s) 402, 420, 422, 702, 902, 1002, 1004, 1005, 1202, 1205, 1204, 1402, 1405, 1404, 1602 include sloped walls 434 to facilitate flow of the multiphase fluid and separation of the layers of the fluid through the flow channel 428, 704, 1006, 1206, 1406, 1606, 1800, 1900, 2504, 2606, 2712.

The example method 2900 of FIG. 29 includes coupling the sensor support(s) to a fluid conduit of the flow meter (block 2906). For example, at least a portion of the plates 120, 122, 124, 126, 128, 212, 214, 226, 218, 220, 312, 314, 316, 318, 320 of FIGS. 1-3 and/or at least a portion of the insert portion(s) 402, 420, 422, 702, 902, 1002, 1004, 1005, 1202, 1205, 1204, 1402, 1405, 1404, 1602 of FIGS. 4-19 can be coupled to the flanges 130, 132, 410, 412, 802, 1504, 1506 of the fluid conduit 102, 202, 302, 403, 700, 903, 1003, 1203, 1403, 1603 of the flow meters 101, 201, 301, 401, 901, 1001, 1201, 1401, 1601 of FIGS. 1-19. The plates 120, 122, 124, 126, 128, 212, 214, 226, 218, 220, 312, 314, 316, 318, 320 of FIGS. 1-3 and/or at least a portion of the insert portion(s) 402, 420, 422, 702, 902, 1002, 1004, 1005, 1202, 1205, 1204, 1402, 1405, 1404, 1602 can be coupled to other surface(s) of the fluid conduit and/or support(s) provided in the fluid conduit (e.g., shelves). As a result, the sensor supports and, thus, the sensors coupled thereto, are disposed in an interior of the fluid conduit for integration with a fluid flow path.

Figure 30:
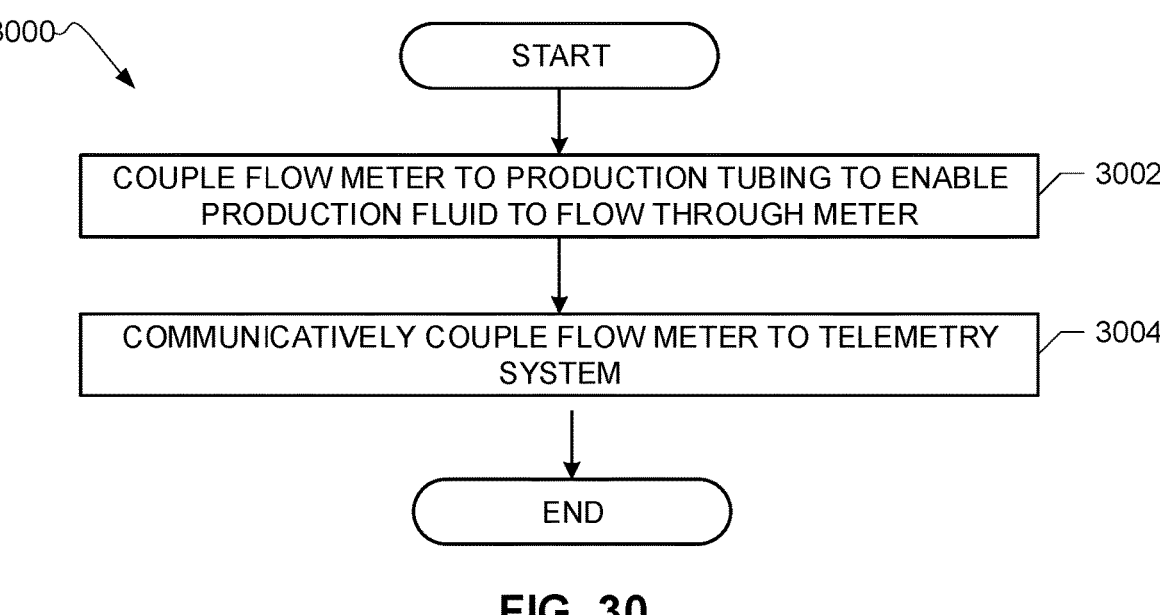
FIG. 30 is a flowchart of an example method for installing a flow meter at tubing in accordance with teachings disclosed herein.

FIG. 30 is a flowchart of an example method 3000 for installing a flow meter at tubing. The example method 3000 includes coupling a flow meter to tubing to enable fluid to flow through the flow meter (block 3002). For example, the flow meter(s) 101, 201, 301, 401, 901, 1001, 1201, 1401, 1601 of FIGS. 1-19 are coupled to tubing 103, 414 via the flanges 130, 132, 410, 412, 802, 1504, 1506 of the fluid conduit 102, 202, 302, 403, 700, 903, 1003, 1203, 1403, 1603 of the flow meter(s) 101, 201, 301, 401, 901, 1001, 1201, 1401, 1601 of FIGS. 1-19. The flanges 130, 132, 410, 412, 802, 1504, 1506 of the fluid conduit 102, 202, 302, 403, 700, 903, 1003, 1203, 1403, 1603 include opening(s) 606 defined therein to align with an inlet 404 and an outlet 406 of the fluid conduits 102, 202, 302, 403, 700, 903, 1003, 1203, 1403, 1603 and with the tubing 103, 414.

The example method 3000 of FIG. 30 includes communicatively coupling the flow meter to a telemetry system (block 3004). For example, the flow meter sensor(s) and/or sensor array(s) 134, 226, 326, 436, 810, 904, 906, 908, 910, 1008, 1208, 1210, 1408, 1410, 1608, 1700, 2208, 2210, 2300, 2304, 2308 of FIGS. 1-19 and 21-28 can be communicatively coupled to one or more processors implementing the example fluid analyzer 138. The communicative couplings can be based on one or more wired or wireless communication protocols. The flow meter(s) 101, 201, 301, 401, 901, 1001, 1201, 1401, 1601 of FIGS. 1-19 can include electronics such as circuit(s) 440, 604, 912 to facilitate the communicative coupling(s). The processor(s) can be disposed downhole or at the surface.

Figure 31:
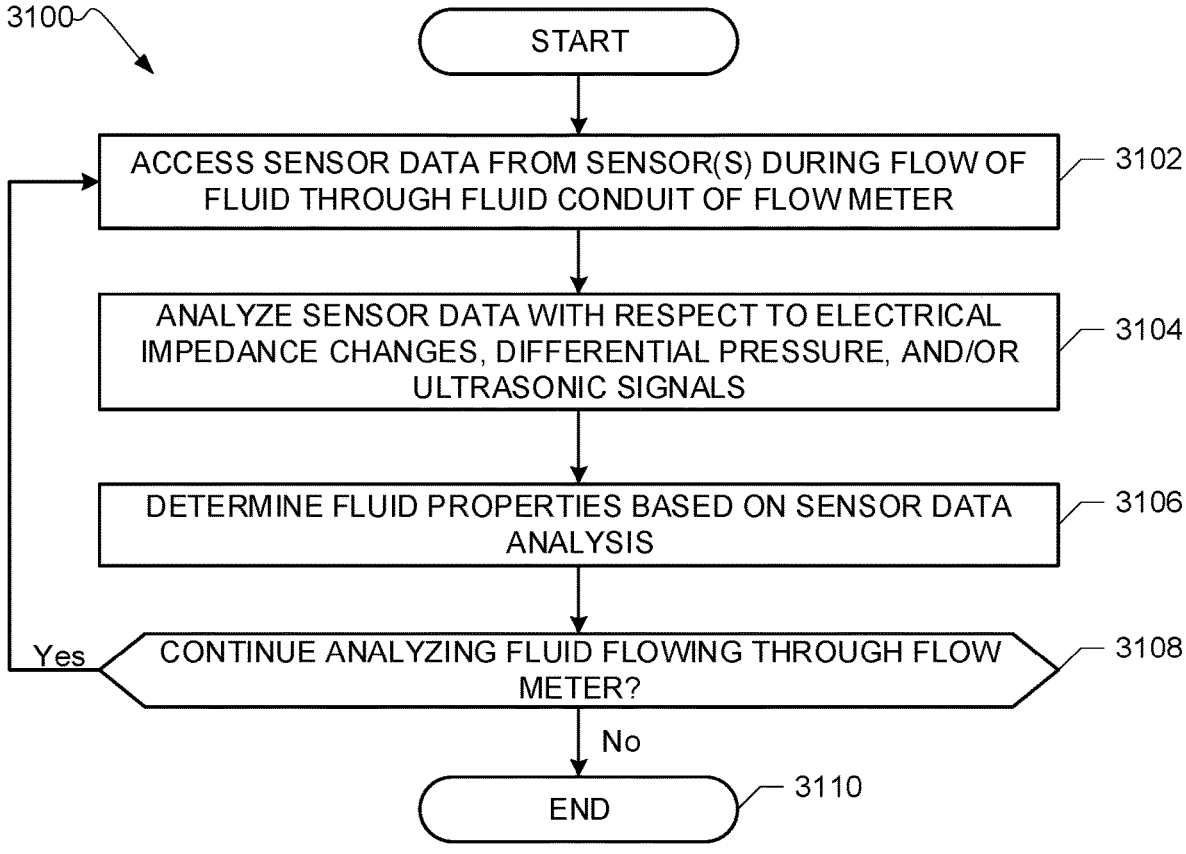
FIG. 31 is a flowchart of an example method that may be executed to implement the example fluid analyzer of FIGS. 1-4, 9, 10, 12, 14 and/or 16.

FIG. 31 is a flowchart of an example method 3100 for determining one or more properties of a multiphase fluid based on data generated by sensors of a flow meter, such as the horizontally disposed flow meter(s) 101, 201, 301, 401, 901, 1001, 1201, 1401, 1601 of FIGS. 1-19. The example method 3100 of FIG. 31 can be implemented by the example fluid analyzer 138 of FIGS. 1-4, 9, 10, 12, 14, 16.

The example method 3100 of FIG. 31 includes accessing sensor data generated by the sensor(s) of the flow meter during flow of the fluid through the flow meter (block 3102). For example, the fluid analyzer 138 can access data generated by the sensor(s) and/or sensor array(s) 134, 226, 326, 436, 810, 904, 906, 908, 910, 1008, 1208, 1210, 1408, 1410, 1608, 2100, 2600, 2602, 2700, 2704, 2708 of FIGS. 1-19 and 21-28 during flow of the multiphase fluid 104, 204, 304, 2207, 2302, 2402, 2506, 2608, 2714 through the fluid conduit 102, 202, 302, 403, 700, 903, 1003, 1203, 1403, 1603 of the flow meter(s) 101, 201, 301, 401, 901, 1001, 1201, 1401, 1601 of FIGS. 1-19. The sensor data can be transmitted to the fluid analyzer 138 via one or more wired or wireless communication protocols. In some examples, the sensor data includes pressure and/or temperature generated by the sensor(s) 136, 228, 232, 234, 333, 610, 1700, 1704 gas and/or liquid velocity data generated by the sensor(s) 116, 118, 134, 328, 330, 610, 1010, 1210, 1410, 1412 of the flow meter (e.g., ultrasonic sensors). The sensor data can be stored in the database 140 of the fluid analyzer 138.

The example method 3100 of FIG. 31 includes analyzing the sensor data with respect to changes in electrical impedance, differential pressures, and/or ultrasonic signals (block 3104). For example, the calculator 142 of the fluid analyzer 138 can analyze the sensor data indicative of changes in electrical impedance (e.g., capacitance, conductance) with respect to the plates 120, 122, 124, 126, 128, 212, 214, 226, 218, 220, 312, 314, 316, 318, 320 of FIGS. 1-3, the sensor arrays 600, 904, 908, 1008, 1208, 1408, 1608 of FIGS. 6-19, and/or the electrical wire coils 2208, 2210, 2212, 2214, 2800, 2802, 2804, 2806, 2812, 2814 of FIGS. 21-28. As another example, the calculator 142 can determine a differential pressure measurement between the two points in the flow channel 1606 of FIGS. 16-19 using the pressure sensors 1702, 1704 disposed at the ceiling and floor of the flow channel 1606. As another examples, the calculator 142 can analyze data generated by the ultrasonic gas transducers 1502, 1708 of FIGS. 15 and/or 17.

The example method 3100 of FIG. 31 includes determining one or more properties of the multiphase fluid based on the analysis of the sensor data (block 3106). For example, the calculator 142 of the fluid analyzer 138 can determine fluid properties such as a height of a liquid flow layer of the multiphase fluid, a water holdup value, a liquid holdup value, and/or a water-in-liquid ratio value. The calculator 142 of the fluid analyzer 138 can determine gas, liquid, water, and/or oil volumetric flow rates based on the electrical impedance sensor data and flow velocity data. The example communicator 144 of the fluid analyzer 138 can output the fluid property data for presentation in one or more formats (e.g., textual, graphical).

The example method 3100 of FIG. 31 includes determining if analysis of the fluid flowing through the flow meter is to continue (block 3108). If the analysis of fluid flowing through the flow meter is to continue, the example method 3100 continues to access sensor data to analyze the flow. The example method 3100 ends when a decision is made to end analysis of the fluid flowing through the flow meter (e.g., based on predefined rules or user inputs) (block 3110).

FIG. 32 illustrates a flow chart of another example method 3200 for determining one or more properties of a multiphase fluid based on data generated by sensor(s) of a flow meter, such as the flow meter(s) 101, 201, 301, 401, 901, 1001, 1201, 1401, 1601 of FIGS. 1-19. In particular, the method 3200 of FIG. 32 illustrates an example implementation of the method 3100 of FIG. 31 using the example sensor arrays 2500, 2600, 2700 of FIGS. 25-28 including the sensors 2100, 2704, 2708 to determine an overall water holdup value for a multiphase fluid flowing past the sensor arrays 2500, 2600, 2700. The example method 3200 of FIG. 32 can be implemented by the example fluid analyzer 138 of FIGS. 1-4, 9, 10, 12, 14, 16.

The example method 3200 of FIG. 32 includes accessing electrical impedance data generated by the sensor(s) of a first sensor array of the flow meter during flow of the fluid through the flow meter (block 3202). The sensor data can be generated by the sensor(s) 2100, 2704, 2708 of the sensor array 2500, 2600, 2700 of FIGS. 25-28. The sensor data is transmitted to the fluid analyzer 138 via one or more wired or wireless communication protocols and stored in the database 140. In the example of FIG. 32, the sensor data is indicative of impedance changes measured at the electrical excitation and/or detection coils 2208, 2210, 2212, 2214, 2800, 2802, 2804, 2806, 2812, 2814 wound about a core 2102, 2808 of the sensor(s) 2100, 2704, 2708. The impedance data can include electrical measurement data such as voltage, current, resonance, and/or complex impedance. The sensor(s) 2100, 2704, 2708 generate the data in response to the application of a voltage or current source across the sensor array(s) 2500, 2600, 2700 and by measuring the electrical impedance values of the excitation or detection coils.

The example method 3200 of FIG. 32 includes generating a liquid property profile for the fluid, such as conductivity or permittivity profile (block 3204). For example, the calculator 142 generates a conductivity or permittivity profile for the fluid relative to a vertical depth of the flow channel 2606, 2712 of FIGS. 26 and 27 including the sensor array(s) 2500, 2600, 2700. The calculator 142 can generate the liquid property profile based on the impedance data and the location of the sensor(s) 2100, 2704, 2708 of the sensor array along the flow channel.

The example method 3200 of FIG. 28 includes generating a water holdup profile from the liquid property profile (block 3206). For example, the calculator 142 can generate the water holdup profile based on the liquid property profile (e.g., conductivity or permittivity) and one or more mixing models or rules (e.g., Bruggeman's mixing model).

The example method 3200 of FIG. 32 includes verifying an accuracy of the water holdup profile for the fluid using a forward model (block 3208). For example, the calculator 142 uses the estimated water holdup profile as an input for a forward model (e.g., a numerical Maxwell equation solver). The calculator 142 uses the forward model to generate a stimulated or expected sensor array output data profile (e.g., electrical impedance data) for the fluid.

The example method 3200 of FIG. 32 includes comparing an expected sensor data profile and an actual sensor data profile (e.g., electrical impedance data) relative to a predefined error threshold (block 3210) and determining if the actual sensor data profile satisfies the error threshold (block 3212). In the example of FIG. 32, if the actual sensor data profile does not satisfy the error threshold, the example method 3200 includes modifying the estimated water holdup profile (block 3214). For example, the calculator 142 adjusts the estimated water holdup profile based on the characteristics of the error between the expected and the actual sensor data.

The example method 3200 includes re-verifying the modified water holdup profile using the forward model and iteratively adjusting the water holdup profile until the actual water holdup profile satisfies the error threshold (blocks 3208, 3210, 3212, 3214). For example, the calculator 142 continues to modify the water holdup profile until the water holdup profile satisfies the error threshold indicative of minimal error between the expected and actual water holdup value(s).

The example method 3200 includes integrating the verified water holdup profile with water holdup profiles generated based on sensor data from other sensor array(s) of the flow meter to determine an overall water holdup for the multiphase fluid flowing in the flow meter (block 3216). For example, the calculator 142 can perform a spatial integration to integrate the water holdup profile(s). Thus, data generated from two or more sensor arrays of the flow meter can be integrated to provide a comprehensive analysis of the fluid.

In the example of FIG. 32, if a water cut value, or a ratio of water flow rate to total liquid flow, is to be determined (block 3218), the example method 3200 includes combining the integrated water holdup distribution profile with a velocity distribution profile for the fluid to determine the water cut value (block 3220). The calculator 142 can generate the velocity distribution profile based on actual flow velocity data (e.g., sensor data) or based on fluid model(s) that provide theoretical velocity profile(s).

The flowcharts of FIGS. 31 and 32 are representative of example hardware logic, machine readable instructions, hardware implemented state machines, and/or any combination thereof for implementing the fluid analyzer 138 of FIGS. 1-4, 9, 10, 12, 14. The machine readable instructions may be an executable program or portion of an executable program for execution by a computer processor such as the processor 3312 shown in the example processor platform 3300 discussed below in connection with FIG. 33. The program may be embodied in software stored on a non-transitory computer readable storage medium such as a CD-ROM, a floppy disk, a hard drive, a DVD, a Blu-ray disk, or a memory associated with the processor 3312, but the entire program and/or parts thereof could alternatively be executed by a device other than the processor 3312 and/or embodied in firmware or dedicated hardware. Further, although the example program is described with reference to the flowcharts illustrated in FIGS. 31 and 32, many other methods of implementing the example fluid analyzer 138 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 31 and 32 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

While an example manner of implementing the fluid analyzer 138 is illustrated in FIGS. 1-4, 9, 10, 12, 14, 16 one or more of the elements, processes and/or devices illustrated in FIGS. 1-4, 9, 10, 12, 14, 16 may be combined, divided, re-arranged, omitted, eliminated and/or implemented in any other way. Further, the example database 140, the example calculator 142, the example communicator 144, and/or, more generally, the example fluid analyzer 138 of FIGS. 1-4, 9, 10, 12, 14, 16 may be implemented by hardware, software, firmware and/or any combination of hardware, software and/or firmware. Thus, for example, any of the example database 140, the example calculator 142, the example communicator 144, and/or, more generally, the example fluid analyzer 138 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 140, the example calculator 142, and/or the example communicator 144 is/are hereby expressly defined to include a non-transitory computer readable storage device or storage disk such as a memory, a digital versatile disk (DVD), a compact disk (CD), a Blu-ray disk, etc. including the software and/or firmware. Further still, the example fluid analyzer 138 of FIGS. 1-4, 9, 10, 12, 14, 16 may include one or more elements, processes and/or devices in addition to, or instead of, those illustrated in FIGS. 1-4, 9, 12, 14, 16, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 33:
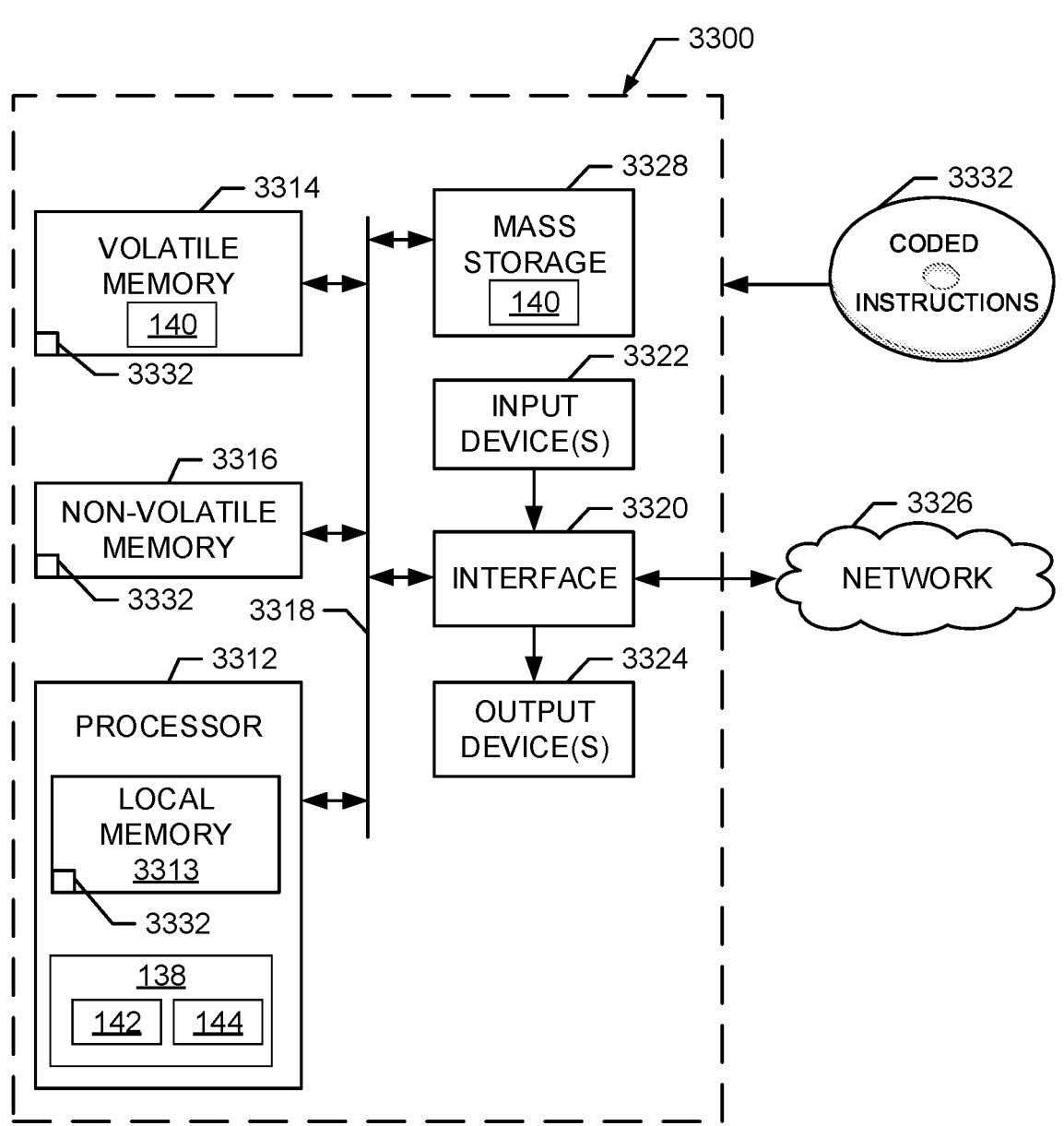
FIG. 33 is a processor platform to execute instructions to implement the methods of FIGS. 31 and/or 32 and/or, more generally, the example fluid analyzer of FIGS. 1-4, 9, 10, 12, 14 and/or 16.

FIG. 33 is a block diagram of an example processor platform 3300 structured to execute instructions to implement the methods of FIGS. 31 and/or 32 to implement the fluid analyzer 138. The processor platform 3300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 3300 of the illustrated example includes a processor 3312. The processor 3312 of the illustrated example is hardware. For example, the processor 3312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example calculator 142 and the example communicator 144.

The processor 3312 of the illustrated example includes a local memory 3313 (e.g., a cache). The processor 3312 of the illustrated example is in communication with a main memory including a volatile memory 3314 and a non-volatile memory 3316 via a bus 3318. The volatile memory 3314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 3316 may be implemented by flash memory and/or any other desired type of memory device. Access to the main memory 3314, 3316 is controlled by a memory controller.

The processor platform 3300 of the illustrated example also includes an interface circuit 3320. The interface circuit 3320 may be implemented by any type of interface standard, such as an Ethernet interface, a universal serial bus (USB), a Bluetooth® interface, a near field communication (NFC) interface, and/or a PCI express interface.

In the illustrated example, one or more input devices 3322 are connected to the interface circuit 3320. The input device(s) 3322 permit(s) a user to enter data and/or commands into the processor 3312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 3324 are also connected to the interface circuit 3320 of the illustrated example. The output devices 3324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 3320 of the illustrated example, thus, typically includes a graphics driver card, a graphics driver chip and/or a graphics driver processor.

The interface circuit 3320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 3326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 3300 of the illustrated example also includes one or more mass storage devices 3328 for storing software and/or data. Examples of such mass storage devices 3328 include floppy disk drives, hard drive disks, compact disk drives, Blu-ray disk drives, redundant array of independent disks (RAID) systems, and digital versatile disk (DVD) drives.

Coded instructions 3332 of FIG. 33 may be stored in the mass storage device 3328, in the volatile memory 3314, in the non-volatile memory 3316, and/or on a removable non-transitory computer readable storage medium such as a CD or DVD.

From the foregoing, it will be appreciated that the above-disclosed apparatus, systems, and methods provide for analysis of a multiphase fluid flowing through a horizontally oriented or downwardly inclined flow pipe. Example flow meters disclosed herein are integrated with or aligned with the horizontal or downhill flow path of the fluid. Some example flow meters disclosed herein include means for conditioning the fluid flow (e.g., plate(s), insert(s)) that alter a cross-sectional shape of the flow to facilitate stratification of the layers of the multiphase fluid and detection of the properties of the fluid flow phases by sensors of the flow meters. Some examples disclosed herein include non-contact sensors that detect effects of magnetic fields on the fluid. Data generated by the sensors of the example horizontal or downwardly inclined flow meters disclosed herein can be used to determine fluid properties such as water-in-liquid values, liquid hold, and water holdup without changing a direction of the horizontal or downward inclined flow of the fluid to a vertical flow.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

An example apparatus includes a fluid conduit coupled to tubing. A multiphase fluid is to flow from the tubing into the fluid conduit. The example apparatus includes a flow channel defined in the fluid conduit. The fluid is to flow through the flow channel. The flow channel has a cross-sectional shape different from a cross-sectional shape of the tubing. The example apparatus includes one or more sensors coupled to the flow channel to generate data indicative of a property of the multiphase fluid.

In some examples, the cross-sectional shape of the flow channel is trapezoidal.

In some examples, the fluid conduit defines a chamber therein. A first end of the flow channel is in communication with the chamber.

In some examples, the flow channel is defined by an insert including a first insert and a second insert spaced apart from the first insert. In some such examples, the insert is to be separately coupled to the fluid conduit. In some other such examples, the insert is integrally formed with the fluid conduit.

In some examples, the sensor is a first sensor and the apparatus further includes a second sensor coupled to an exterior of the fluid conduit.

In some examples, a diameter of the fluid conduit is greater than a diameter of the tubing.

In some examples, the fluid conduit is disposed in a substantially horizontal orientation or a downwardly inclined orientation.

In some examples, the sensor is disposed in a sensor array. The sensor array is to extend along a vertical height of the insert.

Another example apparatus includes a fluid conduit and means for conditioning a flow of a multiphase fluid through the fluid conduit. The means for conditioning is disposed in the fluid conduit. The example apparatus includes a sensor coupled to the means for conditioning. The sensor is to generate sensor data during the flow of the multiphase fluid through the fluid conduit. The example apparatus includes a processor. The sensor is communicatively coupled to the processor. The processor is to determine a property of the multiphase fluid based on the sensor data.

In some examples, the means for conditioning the flow includes a plate disposed along a longitudinal axis of the fluid conduit.

In the plate is a first plate and the sensor is a first sensor, and further including a second plate having a second sensor coupled thereto, the processor to measure electrical impedance between the first plate and the second plate based on data from the first sensor and the second sensor.

In some examples, the plate includes a plurality of sensors coupled thereto. The processor is to measure electrical impedance between respective ones of the plurality of sensors coupled to the plate.

In some examples, the means for conditioning the flow includes an insert defining a flow channel for the multiphase fluid.

In some examples, the property of the multiphase fluid is one of a water holdup value, liquid holdup value, or a liquid velocity value.

Another example apparatus includes a fluid conduit and a channel defined in the fluid conduit. The channel is to provide a flow path for a multiphase fluid. The example apparatus includes a sensor to generate sensor data during flow of the multiphase fluid through the channel. The example apparatus includes a processor. The sensor is communicatively coupled to the processor. The processor is to determine a property of the multiphase fluid based on the sensor data.

In some example, the channel is defined by an insert disposed in the fluid conduit. In some such examples, the sensor is a first sensor coupled to a first portion of the insert and the apparatus further includes a second sensor coupled to a second portion of the insert. The second sensor is disposed opposite the first sensor relative to the channel.

In some examples, the sensor includes a magnetic circuit. In some such examples, the magnetic circuit includes a first electrical coil and application of a current or voltage to the first coil is to generate a magnetic field or an electrical field in the multiphase fluid. In some such examples, the processor is to determine a conductivity or a permittivity of the multiphase fluid based on sensor data indicative of an impedance change at the first coil at a second coil. In some such examples, the first coil is an excitation coil and the second coil is a detection coil.

In some examples, the sensor includes one or more metal electrodes.

In some examples, the processor is to determine a water holdup value based on the sensor data and verify the water holdup value based on a forward model.

An example method includes determining, by executing an instruction with a processor, a change in electrical impedance based on first sensor data for a fluid flowing through a flow meter, the first sensor data generated by a first sensor array of the flow meter; generating, by executing an instruction with the processor, a first water holdup profile for the fluid based on the sensor data; integrating, by executing an instruction with the processor, the first water holdup profile with a second water holdup profile to generate an integrated water holdup profile, the second water holdup profile generated based on second sensor data for the fluid, the second sensor data generated by a second sensor array of the flow meter; and determining, by executing an instruction with the processor, a water cut value for the fluid based on the integrated water holdup profile.

In some examples, the method includes generating a liquid property profile for the fluid based on the first sensor data, wherein the generating of the first water holdup profile is based on the liquid property profile.

In some examples, the method includes the liquid property profile includes a permittivity profile for the fluid.

In some examples, the method includes generating stimulated sensor data based on the first water holdup profile; performing a comparison of the first sensor data and the stimulated sensor data; and adjusting the first water holdup profile based on the comparison.

In some examples, the determining of the water cut value is based on velocity data for the fluid.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. An apparatus comprising:
a fluid conduit;
a channel defined in the fluid conduit, the channel to provide a flow path for a multiphase fluid, a cross-section of the channel being substantially Y-shaped, the cross-section being transverse to the flow path, a first portion of the cross-section having a first deviation angle relative to a wall of the channel and a second portion of the cross-section having a second deviation angle relative to the wall of the channel, the second deviation angle being greater than the first deviation angle;
an array of sensors positioned partially on the first portion and partially on the second portion of the channel, a sensor of the array of sensors generating sensor data during flow of the multiphase fluid through the channel; and
a processor, the sensor communicatively coupled to the processor, the processor to:
determine a water holdup profile based on the sensor data; and
verify the water holdup profile based on a forward model by:
generating an expected water holdup profile based on the forward model; and
iteratively comparing the water holdup profile to the expected water holdup profile to determine whether a difference between the water holdup profile and the expected water holdup profile falls within an error threshold, and modifying the expected water holdup profile in response to the difference falling outside of the error threshold.

2. The apparatus of claim 1, wherein:
the fluid conduit is coupled to tubing, the multiphase fluid to flow from the tubing into the fluid conduit; and
the channel has a cross-sectional shape different from a cross-sectional shape of the tubing.

3. The apparatus of claim 2, wherein the fluid conduit defines a chamber therein, a first end of the channel in communication with the chamber.

4. The apparatus of claim 2, wherein the channel is defined by an insert including a first insert portion and a second insert portion spaced apart from the first portion.

5. The apparatus of claim 4, wherein the insert is to be separately coupled to the fluid conduit.

6. The apparatus of claim 4, wherein the insert is integrally formed with the fluid conduit.

7. The apparatus of claim 2, wherein the sensor is a first sensor and further including a second sensor coupled to an exterior of the fluid conduit.

8. The apparatus of claim 2, wherein the fluid conduit is disposed in a substantially horizontal orientation or a downwardly inclined orientation.

9. The apparatus of claim 1, wherein the channel is defined by an insert disposed in the fluid conduit.

10. The apparatus of claim 9, wherein the sensor is a first sensor coupled to a first portion of the insert and further including a second sensor coupled to a second portion of the insert, the second sensor disposed opposite the first sensor relative to the channel.

11. The apparatus of claim 1, wherein the sensor includes a magnetic circuit.

12. The apparatus of claim 11, wherein the magnetic circuit includes a first electrical coil and application of a current or voltage to the first electrical coil generates a magnetic field or an electrical field in the multiphase fluid.

13. The apparatus of claim 12, wherein the processor determines a conductivity or a permittivity of the multiphase fluid based on sensor data indicative of an impedance change at the first electrical coil or at a second electrical coil.

* * * * *